United States Patent [19]
Miyata et al.

[11] Patent Number: 5,799,643
[45] Date of Patent: Sep. 1, 1998

[54] SLURRY MANAGING SYSTEM AND SLURRY MANAGING METHOD FOR WIRE SAWS

[76] Inventors: Kensho Miyata; Kazutomo Kinutani; Noboru Katsumata; Kensho Kuroda; Toyotaka Wada, all of c/o Nippei Toyama Corporation Gijutsu-Center 1. Shinmei-cho, Yokosuka, Kanagawa, 239; Akihiro Nakayama; Katsumasa Takahashi, both of c/o Nippei Toyama Corporation Yokohama-Factory 120, Horiguchi, Kanazawa-ku, Yokohama, Kanagawa-ken 236; Takaharu Nishida, c/o Toyobo Co., Ltd., 2-8, Doujimahama 2-chome, Kita-ku, Osaka, Osaka-fu 530; Shouichi Uemura; Tetsuo Kodama, both of c/o Toyobo Co., Ltd. General Research Center 1-1, Katada 2-chome, Ohtsu, Shiga-ken 520-02, all of Japan

[21] Appl. No.: 724,657

[22] Filed: Oct. 1, 1996

[30] Foreign Application Priority Data

| Oct. 4, 1995 | [JP] | Japan | 7-282519 |
| Feb. 2, 1996 | [JP] | Japan | 8-040780 |
| Mar. 4, 1996 | [JP] | Japan | 8-073282 |

[51] Int. Cl.⁶ ............................................. B24D 1/08
[52] U.S. Cl. ............. 125/21; 451/446; 451/60; 209/17; 209/18
[58] Field of Search ............... 425/21; 451/446, 451/60, 36, 87, 88; 209/17, 18, 269, 268, 461, 455; 125/16.01, 16.02

[56] References Cited

U.S. PATENT DOCUMENTS

| 4,059,929 | 11/1977 | Bishop | 51/263 |
| 4,762,422 | 8/1988 | Toncelli | 366/136 |
| 4,872,975 | 10/1989 | Benson | 210/99 |
| 5,080,807 | 1/1992 | Carr et al. | 209/17 |
| 5,285,903 | 2/1994 | Sorenson et al. | 209/17 |
| 5,287,975 | 2/1994 | Chumley et al. | 209/18 |
| 5,295,583 | 3/1994 | Bischofberger et al. | 209/17 |

FOREIGN PATENT DOCUMENTS

| 554097 | 6/1923 | France. | |
| 59-232762 | 12/1984 | Japan. | |
| 61-014862 | 1/1986 | Japan. | |
| 403208555 | 9/1991 | Japan | 451/466 |
| 6-39724 | 2/1994 | Japan. | |
| 6114828 | 4/1994 | Japan. | |
| 7-251373 | 10/1995 | Japan. | |
| 8099261 | 4/1996 | Japan. | |
| 678610 | 10/1991 | Switzerland. | |
| 938494 | 10/1963 | United Kingdom. | |

OTHER PUBLICATIONS

Semco Corporation Product Brochure: Slurry Mixing System, Apr. 1, 1997.

*Primary Examiner*—Robert A. Rose
*Assistant Examiner*—George Nguyen
*Attorney, Agent, or Firm*—Stetina Brunda Garred & Brucker

[57] ABSTRACT

A slurry managing system for a wire saw is disclosed. The wire saw includes a wire that has a plurality of wire lines extending in parallel to one another. The wire is supplied with slurry containing abrasive grains in dispersing liquid to cut a workpiece so as to simultaneously produce a multiplicity of wafers. A mixer device mixes the slurry prior to supplying of the slurry to the wire saw. A first supplying device supplies the grains to the mixer device. A second supplying device supplies the dispersing liquid to the mixer device. A first adjusting device adjusts the amount of the grains supplied to the mixer device from the first supplying device. A second adjusting device adjusts the amount of the liquid supplied to the mixer device from the second supplying device.

25 Claims, 17 Drawing Sheets

5,799,643

1

SLURRY MANAGING SYSTEM AND SLURRY MANAGING METHOD FOR WIRE SAWS

BACKGROUND OF THE INVENTION

1. Field of the Invention

The present invention relates to a slurry managing system and a slurry managing method for wire saws that cut workpieces, such as silicon ingots, into thin plates by using slurry that includes abrasive grains. More particularly, the present invention pertains to a slurry managing system and a slurry managing method that is capable of controlling the percentage content of abrasive grains contained in the slurry at an optimum level.

2. Description of the Related Art

A so-called inner saw, which is a cutting apparatus, was employed in the prior art to produce wafers from materials such as ceramic, substrates for IC chips, silicon for solar batterys, and synthetic quartz. This apparatus uses a cutting blade to cut the material and produce wafers one at a time. Therefore, it takes a long time to produce a large number of wafers. In addition, the cutting blade produces cutting chips and consumes a large volume of the material. This decreases the number of wafers that may be produced from a single workpiece.

To solve these problems, a so-called wire saw has been developed in recent years. As shown in FIG. 19, a typical wire saw includes three rollers 12a, 12b, 12c, a wire 10, and supply pipes 13. The wire 10 is spirally wound about the rollers 12a, 12b, 12c with a predetermined interval between each winding. The supply pipes 13 supply slurry to the wire 10. The wire 10 extending between the upper rollers 12a, 12b constitutes a wire group 11 in which each segment of the wire 10 is parallel to an adjacent segment of the wire 10. The slurry includes a dispersing liquid, which is composed of either water or oil, and abrasive grains dispersed by the liquid. The wire saw further includes a receiving tank 14 located in a cutting zone and a slurry tank 15 located at the downstream side of the receiving tank 14. The slurry tank 15 contains slurry and has an agitator 19 arranged therein to agitate the slurry. A pipe 16, which includes a valve V1 and a pump P1, connects the supply pipes 13 to the slurry tank 15. The slurry tank 15 is provided with a slurry supply port 15a through which fresh slurry is provided. A discharge pipe 17, which includes a valve V2, is connected with the slurry tank 15.

To cut a cylindrical workpiece 18 with the above wire saw, the valve V2 is first closed and the valve V1 is opened. The slurry inside the slurry tank 15 is provided to the wire group 11 through the pipe 16 and the supply pipes 13 by the pump P1. Simultaneously, the rollers 12a, 12b, 12c are rotated in a clockwise direction, as viewed in FIG. 19, to feed the wire group 11 toward the right. In this state, the workpiece 18 arranged above the wire group 11 is lowered until it reaches a position below the wire group 11. As the workpiece 18 passes through the wire group 11, the workpiece 18 is sliced and a plurality of wafers are produced.

The cutting capability of the wire group 11 depends largely on the mixed weight ratio of the abrasive grains and the dispersing liquid in the slurry. Hence, for efficient cutting of the workpiece 18, it is necessary to maintain the mixed weight ratio of the abrasive grains and the dispersing liquid in the slurry at a value which brings the cutting capability of the wire group 11 to a maximum level.

During the above cutting process, the slurry provided to the wire group 11 through the supply pipes 13 are received

2 by the receiving tank 14 and collected in the slurry tank 15. After the cutting process is carried out for a predetermined number of cycles, a certain amount of the used slurry is discharged from the slurry tank 15 and the same amount of fresh slurry is supplied to the slurry tank 15 through the supply port 15a. The slurry is regenerated in this manner.

Replacement of a portion of the slurry is carried out due to the cutting chips that become mixed with the slurry during the cutting of the workpiece 18. The amount of cutting chips that enter the slurry increases as the number of the completed cutting cycles increases. Furthermore, the abrasive grains in the slurry are fragmented during the cutting. This reduces the amount of abrasive grains that may be used for cutting. The cutting chips mixed with the slurry and the reduction of the usable abrasive grains lowers the cutting efficiency. Therefore, a portion of the slurry is replaced periodically to prevent this problem. However, the amount of cutting chips and fragmented abrasive grains increases gradually regardless of the periodic replacement of the slurry. Thus, the slurry is completely replaced with fresh slurry after the cutting process is carried out for, for example, a dozen times.

The slurry discharged from the slurry tank 15 during replacement of the slurry is disposed as slurry waste. The slurry waste includes abrasive grains and dispersing liquid that may still be used. The replacement of such slurry with fresh slurry increases the consumption of the abrasive grains and the dispersing liquid required for the cutting. As a result, this increases the cost of the process. In addition, dispersing liquid must be disposed as industrial waste, which adds to the costs.

During replacement of the slurry, fresh abrasive grains and dispersing liquid are provided in the slurry tank 15 and mixed to form slurry. Therefore, a certain length of time is required to replace the slurry. The cutting of the workpiece 18 must be stopped during the replacement since the amount of slurry becomes insufficient during replacement. Replacement of all the slurry takes more time than a partial replacement. The delays caused by slurry replacement lower productivity.

SUMMARY OF THE INVENTION

Accordingly, it is an objective of the present invention to provide a slurry managing system and a slurry managing method for a wire saw that is capable of mixing abrasive grains with dispersing liquid to obtain slurry having a mixed weight ratio that is optimum for the cutting of workpieces.

Another objective of the present invention is to provide a slurry managing system for a wire saw that is capable of recycling abrasive grains and dispersing liquid.

A further objective of the present invention is to provide a slurry managing system for a wire saw that continuously supplies slurry to the wire saw and thus increases cutting efficiency.

To achieve the above objectives, the present invention provides a slurry managing system for a wire saw. The wire saw has a wire with a plurality of wire lines extending in parallel to one another. The wire is supplied with slurry containing abrasive grains in dispersing liquid to cut a workpiece so as to simultaneously produce a multiplicity of wafers. The system includes mixer means for mixing the slurry prior to supplying of the slurry to the wire saw, first supplying means for supplying the grains to the mixer means, second supplying means for supplying the dispersing liquid to the mixer means, first adjusting means for adjusting the amount of the grains supplied to the mixer means from the first supplying means, and second adjusting means for adjusting the amount of the liquid supplied to the mixer means from the second supplying means.

The present invention also provides a method for managing slurry for a wire saw. The wire saw has a wire with a plurality of wire lines extending in parallel to one another. The wire is supplied with slurry containing abrasive grains in dispersing liquid to cut a workpiece so as to simultaneously produce a multiplicity of wafers. The method includes the steps of mixing the slurry in mixer means before said slurry is supplied to the wire saw, and adjusting the amount of the grains and the amount of the dispersing liquid both supplied to the mixer means to set the mixed weight ratio of the abrasive grains and the liquid including the oil within a range between 1:0.91 to 1:0.6 and mixed weight ratio of the abrasive grains and the liquid including the water within a range between 1:0.76 to 1:0.5 when the slurry is mixed in the mixer means.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

First Embodiment

A slurry managing system according to a first embodiment of the present invention will hereafter be described with reference to FIGS. 1 to 5.

Figure 1:
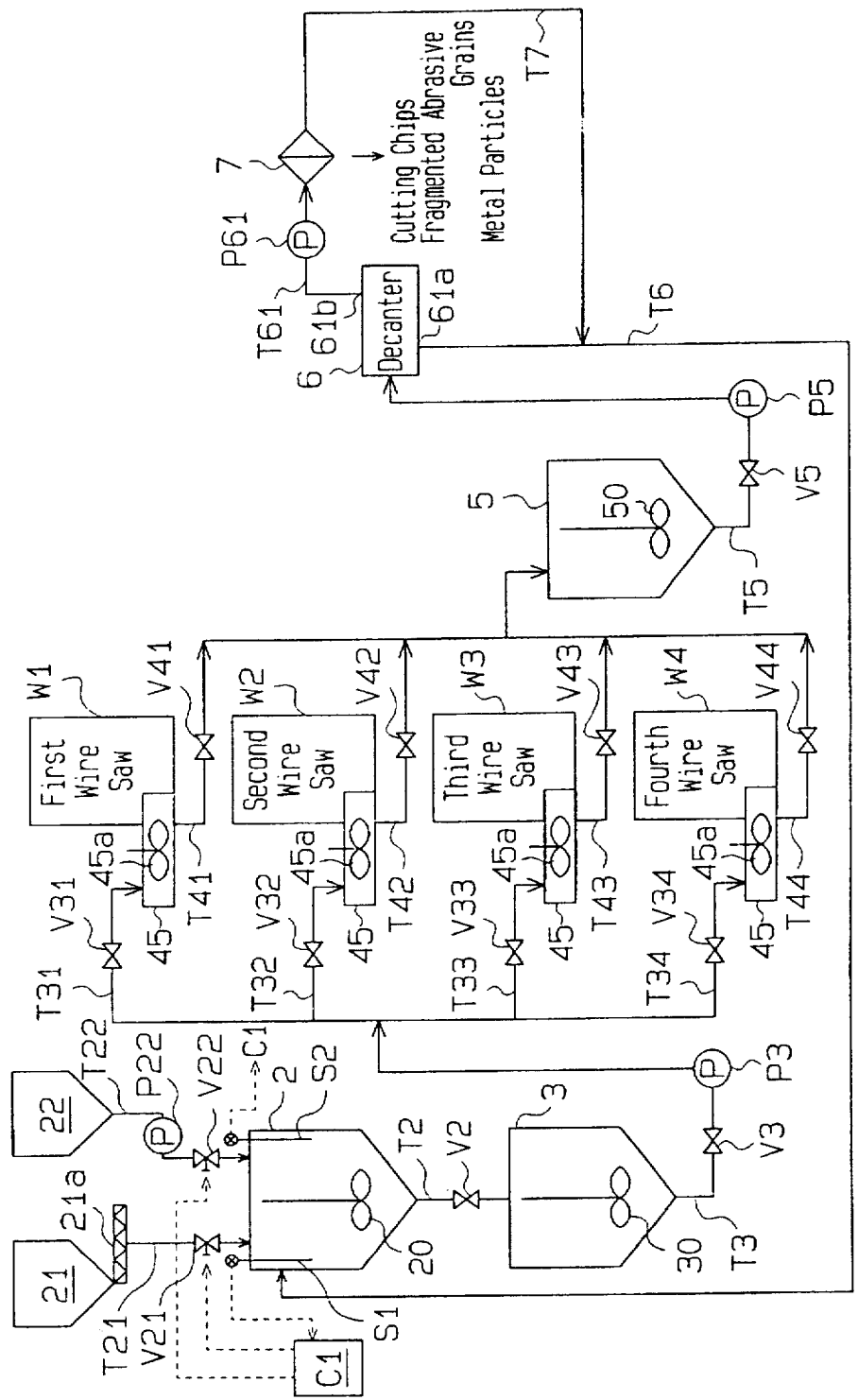
FIG. 1 is a schematic view showing the structure of a slurry managing system according to a first embodiment of the present invention.
Figure 2:
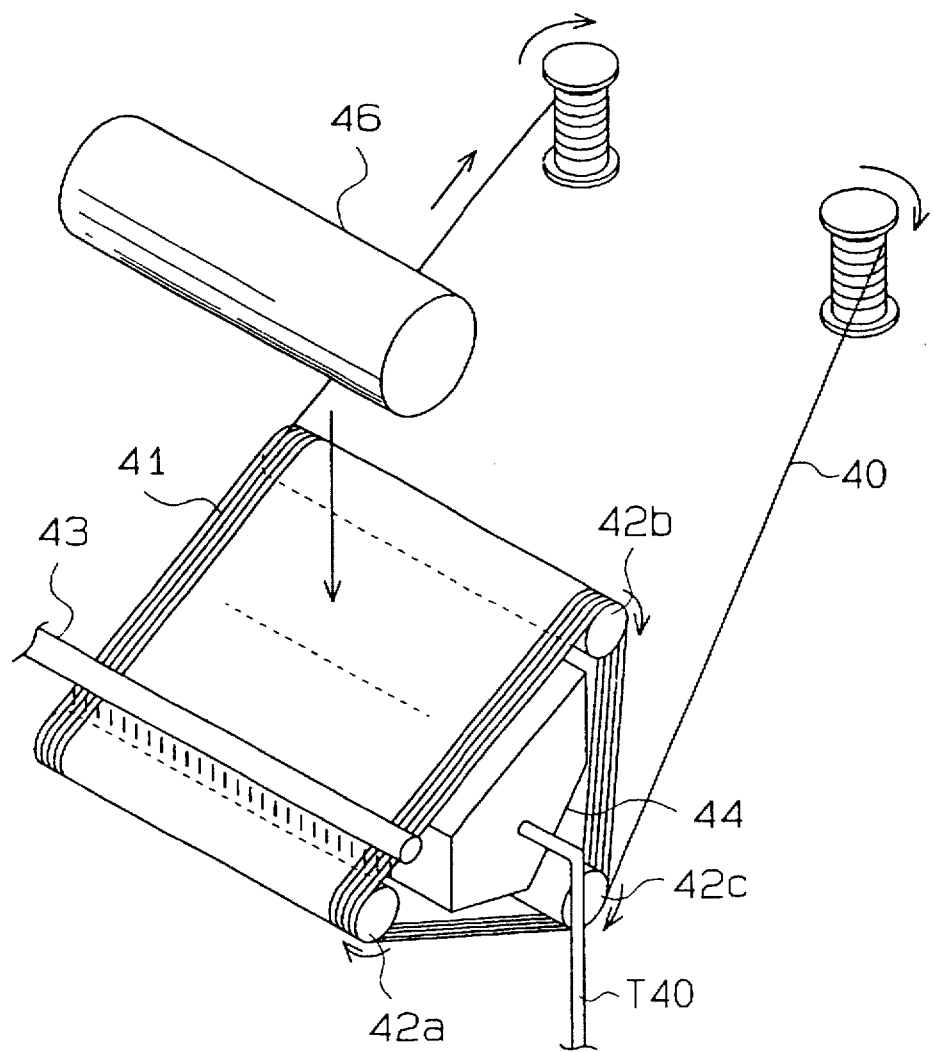
FIG. 2 is a perspective view showing the structure of a wire saw.
Figure 3:
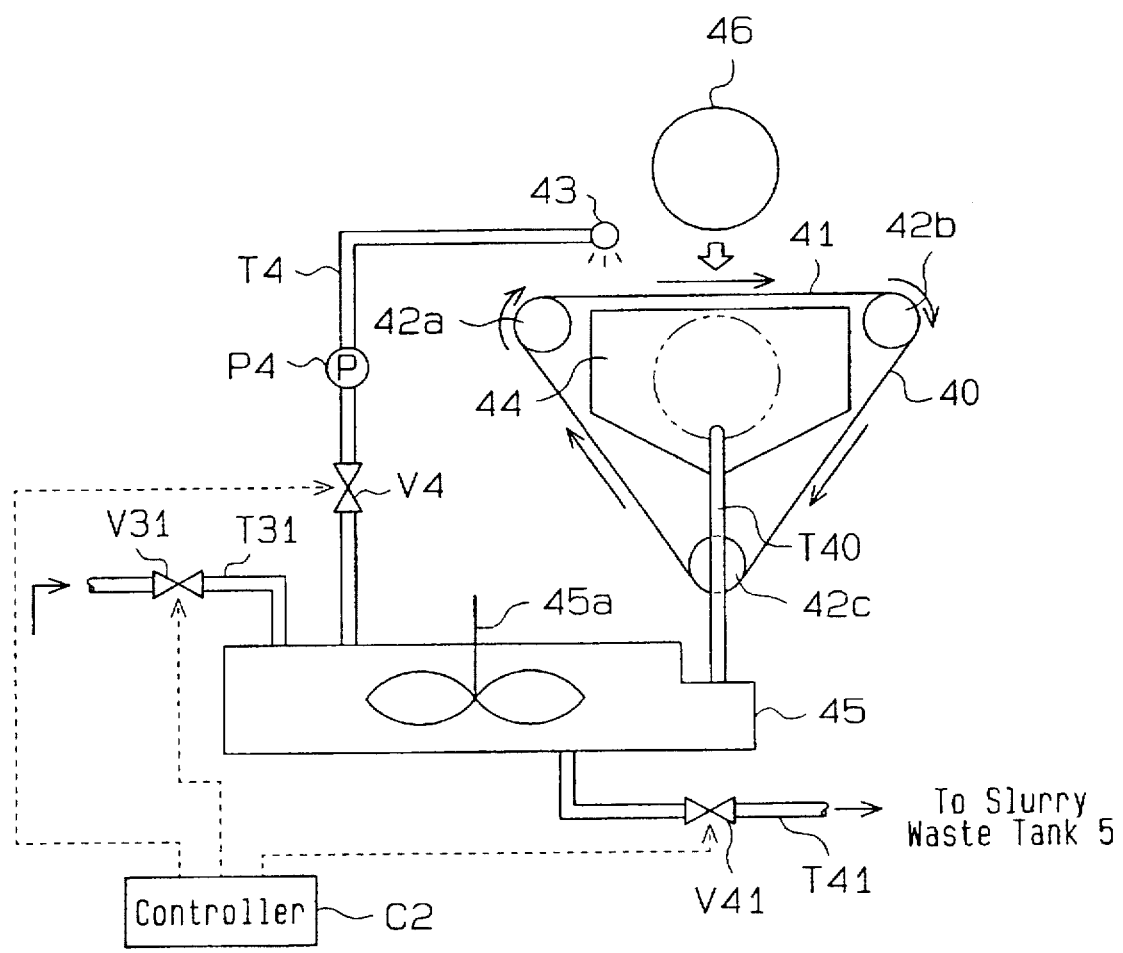
FIG. 3 is a diagrammatic view showing the wire saw and its peripheral structure.

As shown in FIG. 1, a mixing tank 2 constitutes a mixer that mixes slurry. An agitator 20 is arranged in the mixing tank 2. A hopper 21, which feeds abrasive grains to the mixing tank 2, is connected to the tank 2 by a screw feeder 21a and a pipe T21. A valve V21 is provided in the pipe T21 to adjust the amount of abrasive grains supplied to the tank 2. A dispersing liquid tank 22, which supplies dispersing liquid (e.g., a liquid composed of oil, hereafter referred to as base oil) to the mixing tank 2, is connected to the tank 2 by a pipe T22. A valve V22 and a pump P22 are provided in the pipe T22.

A specific gravity meter S1 is arranged in the mixing tank 2 to measure the specific gravity of the slurry. A viscosity meter S2 is arranged in the mixing tank 2 to measure the viscosity of the slurry. The specific gravity meter S1 and the viscosity meter S2 constitute a detecting means that detects the percentage content of the abrasive grains in the slurry. A controller C1 transmits command signals to control the opening of the valves V21, V22 based on the values detected by the specific gravity meter S1 and the viscosity meter S2.

A reserve tank 3, which collects the mixed slurry, is connected to the mixing tank 2 by a pipe T2. The pipe T2 is provided with a valve V2. An agitator 30 is arranged in the reserve tank 3. A plurality of wire saws W1, W2, W3, W4 (four in this embodiment) are each provided with a slurry tank 45. Pipes T31, T32, T33, T34 extending respectively from the slurry tank 45 of each wire saw W1, W2, W3, W4 are each connected to the reserve tank 3 by a pipe T3. A valve V3 and a pump P3 are provided in the pipe T3. Supply valves V31, V32, V33, V34 are provided in the pipes T31, T32, T33, T34, respectively.

Each wire saw W1, W2, W3, W4 is connected to a slurry waste tank 5 by pipes T41, T42, T43, T44 extending respectively from the slurry tank 45 of each wire saw W1, W2, W3, W4. The slurry discharged from each slurry tank 45 is collected in the waste tank 5. An agitator 50 is provided in the waste tank 5. A discharge valve V41, V42, V43, V44 is provided in the pipes T41, T42, T43, T44, respectively.

The wire saws W1–W4 are identical to one another. Therefore, only the first wire saw W1 will be described below with reference to FIGS. 2 and 3. The wire saw W1 includes three rollers 42a, 42b, 42c that define a triangular zone. The wire saw W1 also includes a metal wire 40 that is spirally wound about the rollers 42a, 42b, 42c with a predetermined interval between each winding. The wire 40 extending between the upper rollers 42a, 42b constitutes a wire group 41 in which each segment of the wire 40 is parallel to the adjacent segment of the wire 40. The rollers 42a, 42b, 42c are rotated in a clockwise direction, as viewed in FIG. 3, to feed the wire group 41 toward the right. A workpiece 46 is arranged above the wire group 41 so that it may be lowered until it reaches a position below the wire group 41.

Supply pipes 43 are arranged at an upstream side, with respect to the moving direction of the wire group 41, of an area through which the workpiece 46 moves. The supply pipes 43 extend perpendicularly to each segment of the wire 40 in the wire group 41. Slurry supply slits (not shown) are provided in the lower side of the supply pipes 43 and are aligned so that they extend in the longitudinal direction of the pipes 43. A receiving tank 44 is arranged in the triangular zone defined by the rollers 42a–42c. Slurry falls from between the segments of the wire 40 in the wire group 41 and is collected by the receiving tank 44. The receiving tank 44 is connected to the slurry tank 45 by a pipe T40. An agitator 45a is provided in the slurry tank 45.

The pipes T31, T41 and a supply pipe T4 are connected with the slurry tank 45. The slurry mixed in the mixing tank 2 is sent to the slurry tank 45 through the pipe T31. The slurry in the slurry tank 45 is discharged into the waste tank 5 through the pipe T41. The slurry in the slurry tank 45 is also sent to the supply pipes 43 through the supply pipe T4. A valve V4 and a pump P4 are provided in the supply pipe T4. A controller C2 selectively opens and closes the valves V31, V41, V4 of the pipes T31, T41, T4, respectively.

Figure 4:
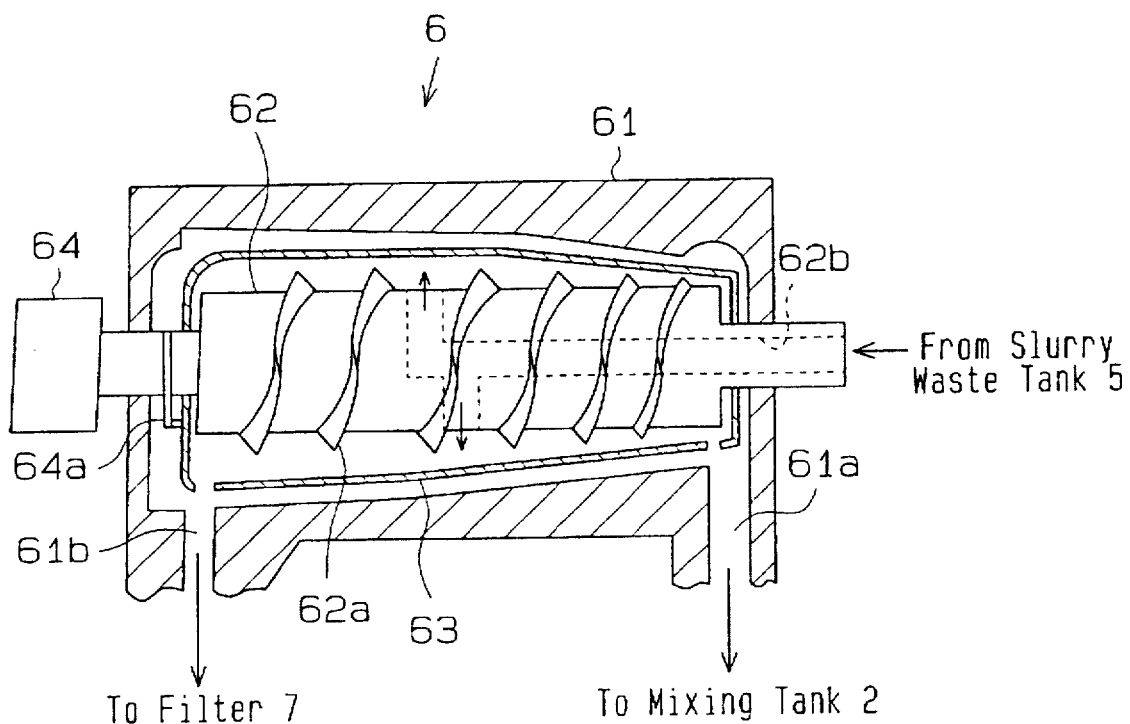
FIG. 4 is a cross-sectional view showing the structure of a decanter.

As shown in FIG. 1, a decanter 6 is connected to the waste tank 5 by a pipe T5. In this embodiment, the decanter 6 serves as a first separating-recovering means. More specifically, the decanter 6 centrifuges the waste slurry discharged from the wire saws W1–W4 and separates the base oil and the granular components that are smaller than the complete and usable abrasive grains from the complete and usable abrasive grains. The usable grains are recovered and recycled. The decanter 6 may have a structure as shown in FIG. 4. As shown in FIG. 4, a screw conveyor 62 is provided in a body 61 of the decanter 6 and arranged so that its axis extends longitudinally in the body 61. A spiral screw 62a is defined on the peripheral surface of the conveyor 62. An inner tube 63 is provided in the body 61 and arranged so that it encompasses the conveyor 62. The conveyor 62 is rotated directly by a motor 64. The inner tube 63 is rotated indirectly by the motor 64 through a belt 64a. This enables the inner tube 63 to rotate at a rotating speed that differs from that of the conveyor 62.

The body 61 includes an outlet 61a for the abrasive grains and an outlet 61b for the oil. The centrifuged solid abrasive grains are discharged from the body 61 through the grain outlet 61a. The base oil and the granular components that are smaller than the complete abrasive grains are discharged from the body 61 through the outlet 61b. A slurry supply passage 62b is defined in the conveyor 62. The supply passage includes an inlet connected with the pipe T5 and an outlet connected with the interior of the inner tube 63. As shown in FIG. 1, the grain outlet 61a is connected to the mixing tank 2 by a first pipe T6. The first pipe T6 serves as a conveyor through which the recovered abrasive grains are conveyed. The outlet 61b is connected to a filter 7 by a pipe T61, which is provided with a pump P61. In this embodiment, the filter 7 serves as a second separating-recovering means.

The filter 7 is, for example, made of a nonwoven fabric. The filter 7 separates the granular components that were discharged from the decanter 6 through the outlet 61b from the base oil and recovers the strained base oil. The filter 7 is connected to the first pipe T6 by way of a second pipe T7. The second pipe T7 serves as a conveying means through which the base oil recovered by the filter 7 is conveyed to the mixing tank 2.

The operation of the slurry managing system having the above structure will now be described. The valve V21 is first opened to supply a predetermined amount of abrasive grains into the mixing tank 2 from the hopper 21 and the screw feeder 21a. The valve V22 is simultaneously opened to supply a predetermined amount of base oil into the mixing tank 2 from the liquid tank 22. The agitator 20 mixes the abrasive grains and the base oil to form slurry in the mixing tank 2. The mixed slurry is temporarily stored in the reserve tank 3. The slurry in the reserve tank 3 is then supplied into the slurry tank 45 of each wire saw W1–W4 by opening the valve V3 and the associated supply valves V31–V34.

The fresh abrasive grains supplied from the hopper 21 consist of grains that are made of materials such as silicon carbide, boron carbide, diamond, and boron nitride. The average grain diameter of the abrasive grains is in the range of 5 to 30 micrometers. Abrasive grains within this diameter range are optimum for slicing the wafers. The mixed weight ratio of the abrasive grains and the base oil mixed in the mixing tank 2 is in the range of 1:0.91 to 1:0.6. For example, if 100 kilograms of abrasive grains are fed from the hopper 21, the liquid tank 22 provides 89 kilograms of base oil. This enables the abrasive grains and the base oil to be mixed into slurry having a mixed weight ratio of 1:0.89. Furthermore, if the base oil is of a type having high viscosity, the viscosity of the slurry is set in the range of 150 to 220 centipoise (cP). If the base oil is of a type having low viscosity, the viscosity of the slurry is set in the range of 40 to 60 centipoise.

The workpieces 46 are cut into wafers by each of the wire saws W1 to W4. The slicing of the workpieces 46 will be described with reference to FIG. 3 using the first wire saw W1 as a representative example. The controller C2 first opens the valve V4 while closing the supply valve V31 and the discharge valve V41. The slurry in the slurry tank 45 is supplied to the wire group 41 through the supply pipes 43 by the pump P4. In this state, each workpiece 46 is lowered from a position above the wire group 41 to a position below the wire group 41. The workpiece 46 is sliced into a plurality of wafers with a single pass through the traveling wire group 41, to which abrasive grains are adhered.

During the cutting, the slurry supplied to the wire group 41 from the supply pipes 43 falls into the receiving tank 44. The slurry is then collected in the slurry tank 45 and sent back to the supply pipes 43 through the pipe T4. The slurry, which has been used to cut the workpiece 46, includes, for example, abrasive grains having an average grain diameter of 5 to 30 micrometers, fragmented abrasive grains having an average grain diameter of 5 to 15 micrometers, cutting chips removed from the workpiece 46 having a grain diameter within the range of a submicron value to a few micrometers, and metal particles removed from the wire 40.

Further cutting of workpieces 46 gradually increases the amount of cutting chips and metal particles in the slurry. This degrades the cutting capability of the slurry. Therefore, during a predetermined cycle of the cutting process (e.g., the second cycle), the controller C2 opens the discharge valve V41 for a predetermined time period and discharges a portion of the used slurry in the slurry tank 45 through the pipe T41. Simultaneously, the controller C2 opens the supply valve V31 for a predetermined time period to provide a predetermined amount of fresh slurry mixed in the mixing tank 2 (FIG. 1) through the reserve tank 3 and the pipe T31. This enables a portion of the slurry in the slurry tank 45 to be replaced with fresh slurry and thus regenerates the slurry in the tank 45 while the cutting of the workpiece 46 is carried out. The controller C2 closes the valves V31, V41 before the cutting cycle of the subsequent workpiece 46 is commenced.

The slurry waste discharged from the slurry tank 45 of each of the wire saws W1–W4 is first collected in the waste tank 5, shown in FIG. 1, and then sent to the decanter 6 when the valve V5 is opened. As shown in FIG. 4, the slurry waste is conveyed into body 61 through the supply passage 62b. The motor rotates the screw conveyor 62 and the inner tube 63 at different rotating speeds and applies a centrifugal force to the slurry. This moves the abrasive grains in the slurry outward toward the inner walls of the body 61 and forms a layer of base oil that includes minute granular components such as the fragmented abrasive grains, the cutting chips, and the metal particles at the inner side of the abrasive grains. In this manner, the abrasive grains in the slurry are separated from the base oil that includes minute granular components.

As shown in FIG. 1, the abrasive grains separated from the slurry in the decanter 6 are sent to the first pipe T6. The pump P61 sends the base oil that includes the minute granular components to the filter 7 through the pipe T61. The filter 7 separates and removes the minute granular components such as cutting chips, the fragmented abrasive grains, and the metal particles from the base oil and thus recovers the oil. The base oil recovered by the filter 7 is conveyed to the first pipe T6 through the second pipe T7 and merged with the abrasive grains. The abrasive grains and the base oil are conveyed to the mixing tank 2 through the first pipe T6.

A centrifugal acceleration of 150 to 500 grav (G), e.g., 300 G, is applied for a time of approximately 80 seconds in the decanter 6 to separate the abrasive grains. The centrifugal acceleration range of 150 to 500 G is optimum for separating abrasive grains having a grain diameter of 5 to 30 micrometers. The abrasive grains recovered by the decanter 6 from the slurry waste is set in the range of 85 to 95 percent by weight. The recovery rate of the minute granular components, such as cutting chips, separated by the filter 7 is set in the range of 30 to 50 percent by weight. The recovery rate of the base oil is set at approximately 90 percent by weight.

The specific gravity and the viscosity of the slurry are detected by the specific gravity meter S1 and the viscosity meter S2, respectively. The detected values are sent to the controller C1. A target value for the specific gravity and the viscosity is prestored in the controller C1. Accordingly, the target values are compared with the detected values. This enables the controller C1 to control the opening of the valves V21, V22 based on the difference between the two values and adjusts the amount of abrasive grains from the hopper 21 and the amount of base oil from the liquid tank 22.

Data is stored in the controller C1 to acknowledge the relationship between the values detected by the specific gravity meter S1 and the viscosity meter S2 (i.e., the specific gravity and viscosity of the slurry) and the percentage content of the abrasive grains included in the slurry. It is characteristic of the slurry that the specific gravity and viscosity become higher as the percentage content of the abrasive grains in the slurry becomes higher. The specific gravity and viscosity becomes lower as the percentage content of the abrasive grains in the slurry becomes lower. Repetition of the cutting of the workpieces 46 gradually increases the amount of fragmented abrasive grains and decreases the amount of complete and normal abrasive grains sent to the mixing tank 2 from the decanter 6. This reduction lowers the specific gravity and the viscosity of the slurry in the mixing tank 2. Accordingly, in such case, the opening of the valve V21 is enlarged to increase the amount of abrasive grains fed from the hopper 21.

The minute granular components, such as the cutting chips, fragmented abrasive grains, metal particles, separated by the filter 7 are removed from the filter 7 and disposed externally. Since the base oil adheres to the minute granular components, the amount of oil sent to the mixing tank decreases gradually. This reduction increases the specific gravity and the viscosity of the slurry in the mixing tank 2. Accordingly, in such case, the opening of the valve V22 is enlarged to increase the amount of base oil supplied from the liquid tank 22.

The mixed weight ratio of the abrasive grains and the base oil of the slurry mixed in the mixing tank 2 is adjusted in the above manner so that it is constantly maintained within the range of 1:0.91 to 1:0.6.

The advantageous effects of this embodiment will now be described.

(a) Abrasive grains and base oil are separated from the slurry waste discharged from the wire saws W1–W4 and recovered so that it may be recycled. This greatly reduces the amount of the added abrasive grains and base oil used to cut the workpieces 46, and decreases the cost of the cutting process.

(b) Slurry may continuously be supplied to the wire saws W1–W4. Thus, the wire saws may perform cutting successively without any interruptions. This increases productivity. Therefore, the uninterrupted cutting saves further costs in addition to the costs saved by the recycling of the abrasive grains and the base oil.

(c) The percentage content of the abrasive grains in the slurry is determined based on the detected specific gravity and viscosity of the slurry. The amount of abrasive grains and base oil is then adjusted so that the percentage content is maintained at a predetermined value. This enables the workpieces 46 to always be cut under stable cutting conditions.

(d) Recycling of the base oil reduces the amount of industrial waste. This drastically reduces the cost required to process the industrial waste.

(e) The mixed weight ratio of the abrasive grains and the base oil mixed to obtain the slurry is adjusted so that it is constantly maintained within the range of 1:0.91 to 1:0.6. The workpieces 46 are cut most easily when the mixed weight ratio of the slurry is set within this range.

Figure 5:
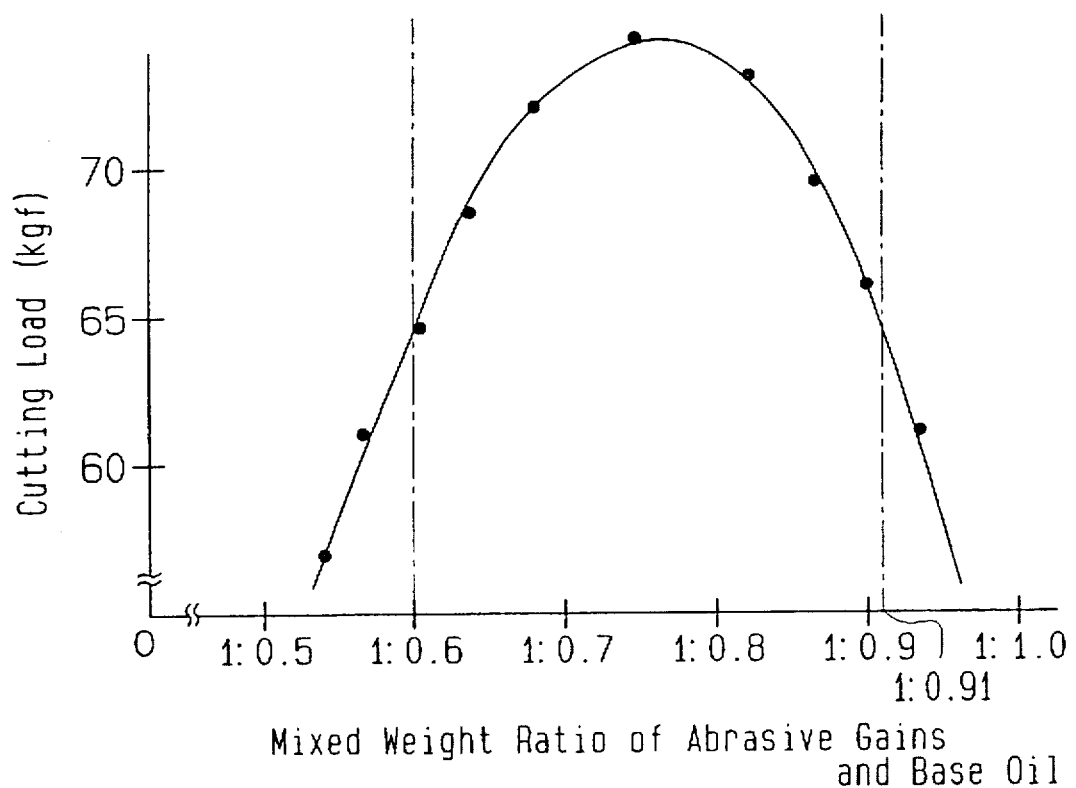
FIG. 5 is a graph showing the relationship between the mixed weight ratio of abrasive grains and base oil in the slurry and the cutting load.

FIG. 5 is a graph showing the relationship between the mixed weight ratio of the abrasive grains and base oil in the slurry and the cutting load. The data for this graph were obtained under the following cutting conditions. A square pillar-like workpiece having a cross-section of 100 square millimeters and made of a polycrystalline silicon was used. The workpiece was cut by a wire having a diameter of 0.18 millimeters and traveling at a velocity of 500 m/min. The workpiece is cut more efficiently as the cutting load is increased. Accordingly, based on the graph of FIG. 5, the mixed weight ratio of the abrasive grains and the base oil in the slurry is set between 1:0.91 to 1:0.6, which is the range in which the cutting load becomes large.

In the above embodiment, the filter 7 may be employed as the first separating-recovering means and the decanter 6 may be employed as the second separating-recovering means. As another option, the filter 7 may be employed for both the first and the second separating-recovering means.

Second Embodiment

A second embodiment according to the present invention will hereafter be described with reference to FIG. 6. Parts identical to those used in the first embodiment will be denoted with the same numerals and will not be described.

Figure 6:
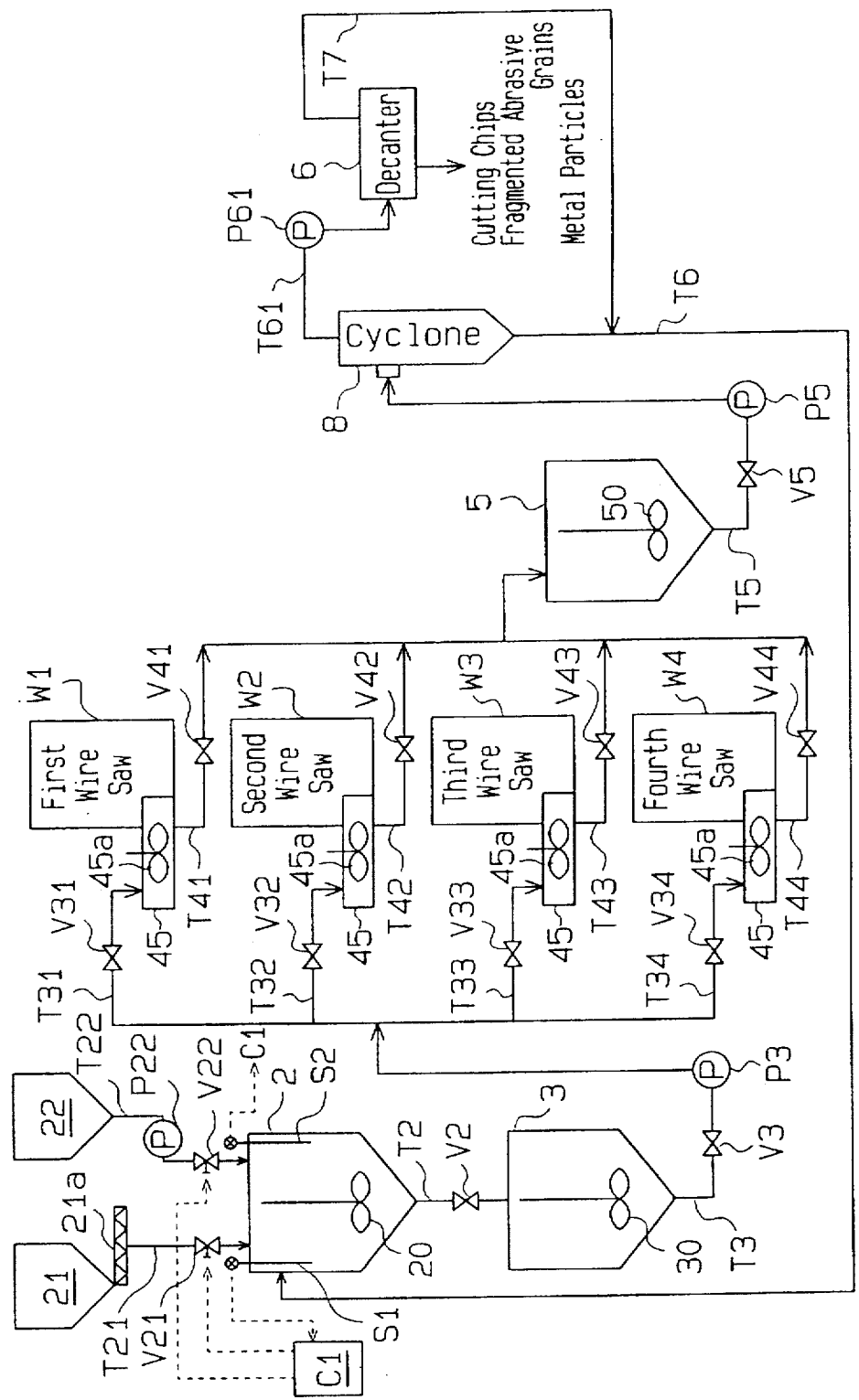
FIG. 6 is a schematic view showing the structure of a slurry managing system according to a second embodiment of the present invention.

As shown in FIG. 6, the slurry managing system of the second embodiment employs a cyclone 8 as the first separating-recovering means and the decanter 6 as the second separating-recovering means. The cyclone 8 separates the minute granular components and the base oil from the slurry waste and recovers the complete and usable abrasive grains. The decanter 6 separates the minute granular components from the base oil and recovers the oil.

More specifically, centrifugal force, which is produced by a cyclonic descending current, acts on the abrasive grains included in the slurry waste. This causes the abrasive grains to collide against the inner walls of the cyclone 8. These abrasive grains are collected as they fall down in the cyclone 8 and are discharged from the bottom section of the cyclone 8 through the first pipe T6. The minute granular components, such as the cutting chips, fragmented abrasive grains, and metal particles, are carried along a cyclonic ascending current and discharged from the top section of the cyclone 8 through the pipe T61. The abrasive grains included in the slurry waste is recovered in this manner. The base oil that includes the minute granular components is sent to the decanter 6 through the pipe T61 by the pump P61. The decanter 6 separates the base oil from the minute granular components.

The abrasive grains separated and recovered by the cyclone 8 are sent to the mixing tank 2 through the pipe T6. The base oil separated and recovered by the decanter 6 is sent to the first pipe T6 through the second pipe T7 and then conveyed toward the mixing tank 2 together with the abrasive grains. The remaining structure and operation of this slurry managing system is the same as the first embodiment.

During the primary separation executed by the cyclone 8, the abrasive grains are separated by applying, for example, centrifugal acceleration of 300 G for a time of 80 seconds. During the secondary separation executed by the decanter 6, the minute granular components are separated from the base oil by applying, for example, centrifugal acceleration of 2,000 to 3,000 G for a time of 50 seconds.

In the second embodiment, the decanter 6 may be employed as the first separating-recovering means and the cyclone 8 may be employed as the second separating-recovering means. As another option, the cyclone 8 may be employed as the first separating-recovering means while the filter 7 of the first embodiment is employed as the second separating-recovering means. The cyclone 8 may be employed as the first separating-recovering means while the filter 7 of the first embodiment is employed as the second separating-recovering means. The filter 7 of the first embodiment may be employed as the first separating-recovering means while the cyclone 8 is employed as the second separating-recovering means. Further, the cyclone 8 may be employed for both the first and the second separating-recovering means.

Third Embodiment

A third embodiment according to the present invention will hereafter be described with reference to FIG. 7. Parts identical to those used in the first embodiment will be denoted with the same numerals and will not be described.

Figure 7:
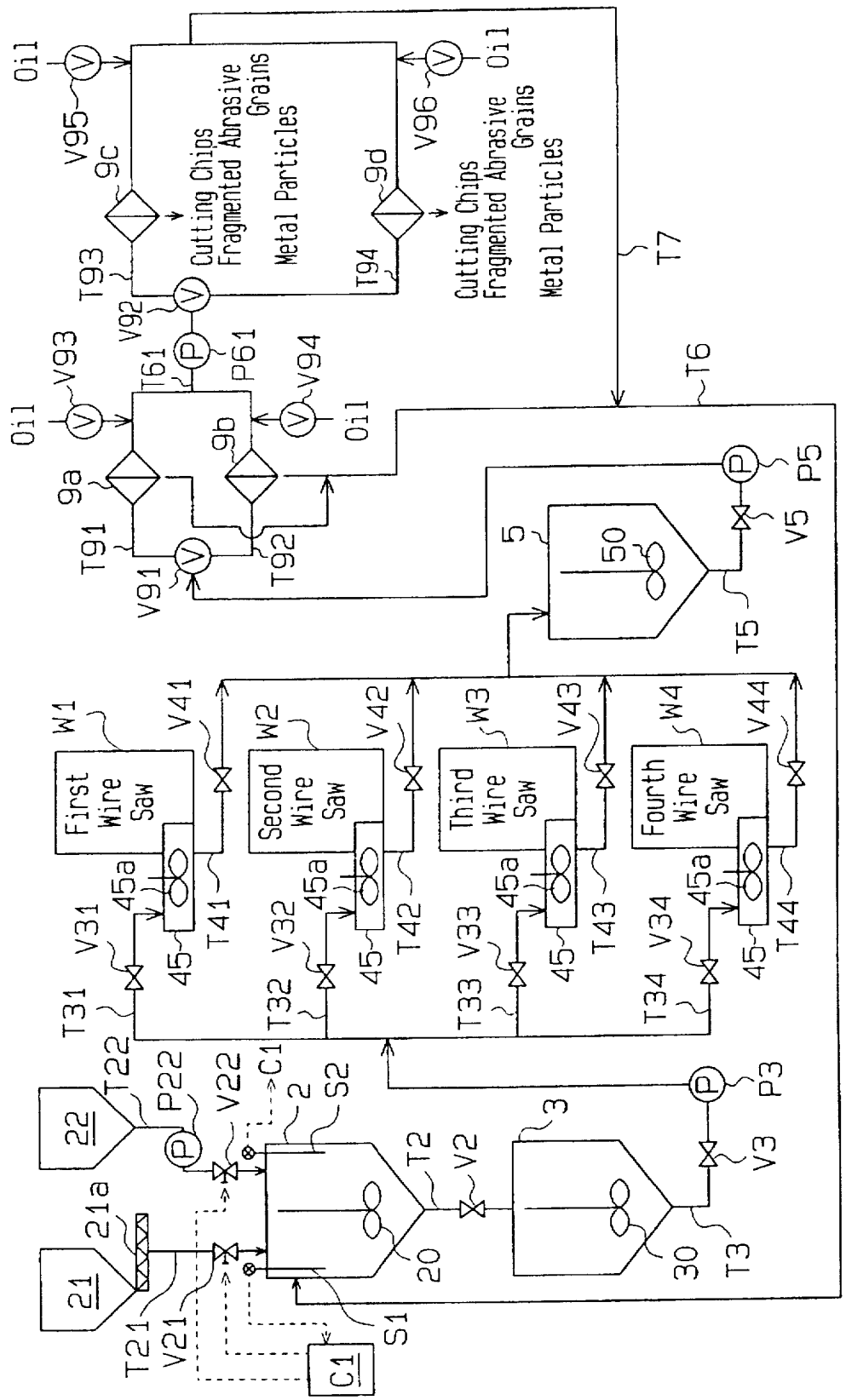
FIG. 7 is a schematic view showing the structure of a slurry managing system according to a third embodiment of the present invention.

As shown in FIG. 7, the slurry managing system of the third embodiment employs a pair of first filters 9a, 9b as the first separating-recovering means and a pair of second filters 9c, 9d as the second separating-recovering means. The first filters 9a, 9b separate the minute granular components and the base oil from the slurry waste and recover the complete and usable abrasive grains. The second filters 9c, 9d separate the minute granular components from the base oil and recover the base oil.

More specifically, a three-way switching valve V91 enables the slurry waste from the waste tank 5 to be supplied alternately to the first filters 9a, 9b through pipes T91, T92, respectively, after every predetermined time period. This separates the minute granular components and the base oil from the slurry waste and recovers the abrasive grains. The base oil that includes the minute granular components are sent toward a three-way switching valve V92 through the pipe T61 by the pump P61. The switching valve V92 enables the minute granular components to be supplied alternately to the second filters 9c, 9d, respectively, after every predetermined time period. This separates the minute granular components from the base oil.

Washing oil is conveyed to the first and second filters 9a, 9b; 9c, 9d through valves V93, V94, V95, V96 that are connected to the pipes T91, T92, T93, T94 at the downstream side of the filters 9a, 9b, 9c, 9d, respectively. While the switching valve V91 supplies the slurry waste to either one of the first filters 9a, 9b, the other filter 9a, 9b is washed by the washing oil flowing from the associated valve V93, V94. In the same manner, while the switching valve V92 supplies the slurry waste to either one of the second filters 9c, 9d, the other filter 9c, 9d is washed by the washing oil flowing from the associated valve V95, V96.

The abrasive grains recovered by the first filters 9a, 9b are sent to the mixing tank 2 through the first pipe T6. The base oil recovered by the second filters 9c, 9d is sent to the first pipe T6 through the second pipe T7 and then conveyed toward the mixing tank 2 together with the abrasive grains. The remaining structure and operation of this slurry managing system is the same as the first and second embodiments.

In the third embodiment, the first filters 9a, 9b may be employed as the first separating-recovering means and the cyclone 8 or the decanter 6 of the second embodiment may be employed as the second separating-recovering means. As another option, the cyclone 8 or the decanter 6 of the second embodiment may be employed as the first separating-recovering means while the second filters 9c, 9d are employed as the second separating-recovering means.

The first, second, and third embodiments may be modified as described below.

(1) The specific gravity meter S1 and the viscosity meter S2 may be arranged in the reserve tank 3 to detect the percentage content of the abrasive grains in the slurry. In this case, the abrasive grains and base oil recovered from the slurry waste may be conveyed to the reserve tank 3.

(2) The specific gravity meter S1 and the viscosity meter S2 may be arranged in the pipe T6 at a location downstream of the intersection with the second pipe T7 to detect the percentage content of the abrasive grains in the slurry within the pipe T6.

(3) The single-purpose reserve tank 3 may be eliminated.

(4) The percentage content of the abrasive grains in the slurry may be detected by only either one among the specific gravity meter S1 and the viscosity meter S2.

(5) The percentage content of the abrasive grains in the slurry may be detected by a detecting means that differs from the specific gravity meter S1 and the viscosity meter S2. For example, the detecting means may be constituted by an optical device such as a turbidimeter.

(6) The amount of the base oil left adhered to the minute granular components and the fragmented abrasive grains separated by the second separating-recovering means is affected by the separating-recovering capability of the first and second separating-recovering means. Therefore, the separating-recovering capability may be referred to when determining the content of the abrasive grains and base oil recovered from the slurry waste.

(7) The dispersing liquid of the slurry may be constituted by water instead of oil. When using a dispersing liquid composed of water, it is preferable that the mixed weight ratio of the abrasive grains and the dispersing liquid be maintained within the range of 1:0.76 to 1:0.5. In comparison with the oil slurry of the first, second, and third embodiments, the percentage content of the abrasive grains of the water slurry is about 20 percent higher. In other words, in comparison with oil slurry, it is difficult for the abrasive grains to be dispersed in a uniform manner in the mixing tank 2 when forming water slurry. Therefore, to, stably provide abrasive grains to the wire saws, it is required that the percentage content of the abrasive grains be high when using water slurry. The workpieces 46 are cut under the optimum cutting conditions when the mixed weight ratio of the water slurry is set within the above range. The viscosity of the water slurry is to be maintained within the range of 40 to 50 cP.

Fourth Embodiment

A fourth embodiment according to the present invention will hereafter be described with reference to FIGS. 8 to 11. Parts identical to those used in the first embodiment will be denoted with the same numerals and will not be described.

Figure 8:
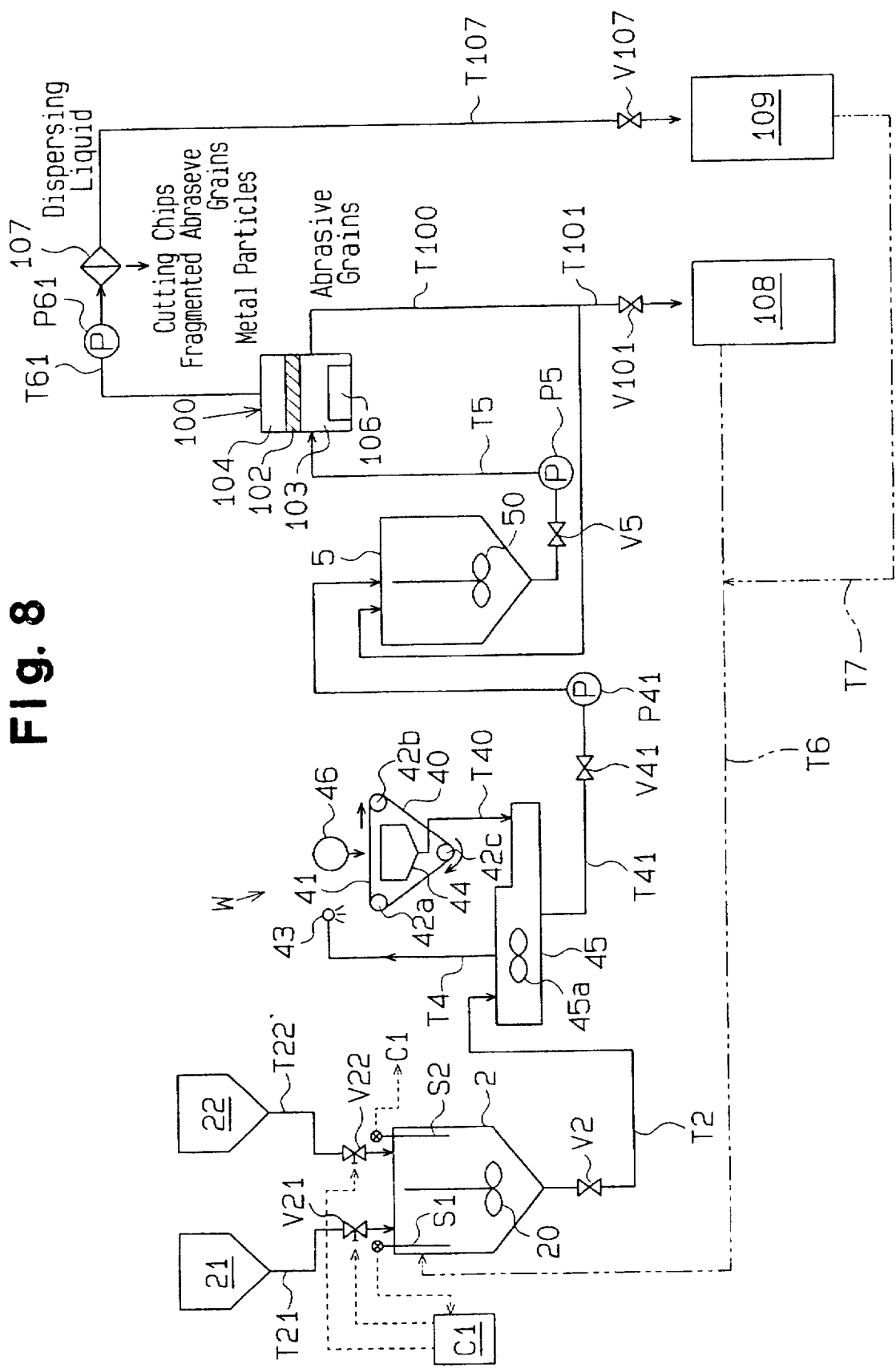
FIG. 8 is a schematic view showing the structure of et slurry managing system according to a fourth embodiment of the present invention.

As shown in FIG. 8, the hopper 21, which feeds abrasive grains into the mixing tank 2, is connected to the mixing tank 2 by the pipe T21, which is provided with the valve V21. The liquid dispersing tank 22, which provides the mixing tank 2 with dispersing liquid, is connected to the mixing tank 2 by the pipe T22, which is provided with the valve V22. Dispersing liquid is composed of either water or oil. The specific gravity meter S1 and the viscosity meter S2 are arranged in the mixing tank 2. The controller C1 transmits a command signal to control the opening of the valves V21, V22 based on the values detected by the meters S1, S2.

The mixing tank 2 is connected to the slurry tank 45 of a wire saw W by the pipe T2, which is provided with the valve V2. The wire saw W has a structure which is identical to the structure of the wire saws W1-W4 employed in the first embodiment and therefore will not be described. The number of wire saws is not restricted and is arbitrary. The slurry tank 45 of the wire saw W is connected to the slurry waste tank 5 by the pipe T41, which includes the discharge valve V41 and the pump P41.

The waste tank 5 is connected to a separating apparatus 100, which constitutes a first separating-recovering means, by the pipe T5, which is provided with a valve V5 and a pump P5. The separating apparatus 100 has a structure such as that shown in FIG. 9. The apparatus 100 includes a cylindrical container 101 which constitutes the apparatus body. A filter 102 is arranged in the container 101 and defines an upstream first chamber 103 and a downstream second chamber 104 at the lower and upper sides in the container 101. The filter 102 is constituted by, for example, a plurality of superimposed round metal screens. A support frame 105 secures the outer rim of the filter 102 to the inner wall of the container 101.

An ultrasonic oscillator 106 is arranged in the first chamber 103 faced toward the filter 102. The area of the upper surface of the ultrasonic oscillator 106 is, for example, about the same as the surface area of the filter 102. The space between the upper surface of the ultrasonic oscillator 106 and the filter 102 is set at, for example, five millimeters. The controller C1 controls the activation and de-activation of the ultrasonic oscillator 106. The controller C1 also controls the opening and closing of the valves and the activation and deactivation of the pumps.

The filter 102 has a plurality of pores that prevent the passage of the abrasive grains and allow the passage of granular components that are smaller than the complete abrasive grains (more specifically, the cutting chips, fragmented abrasive grains, metal particles, etc.) and the passage of the dispersing liquid. The diameter of the pores is determined in accordance with the size of the granular components that are to pass through the filter 102. Thus, the size of the pores is set at, for example, 5 to 20 micrometers. That is, if it is assumed that the pores allow passage of granular components having a grain diameter that is about 60 to 70 percent the diameter of the pores, the diameter of the pores in the filter 102 is set at about 10 micrometers to enable passage of granular components having a grain diameter of about 6 to 7 micrometers. The diameter of the pores is about 1.4 to 1.7 times the size of the granular components which are to pass through the pores.

Figure 9:
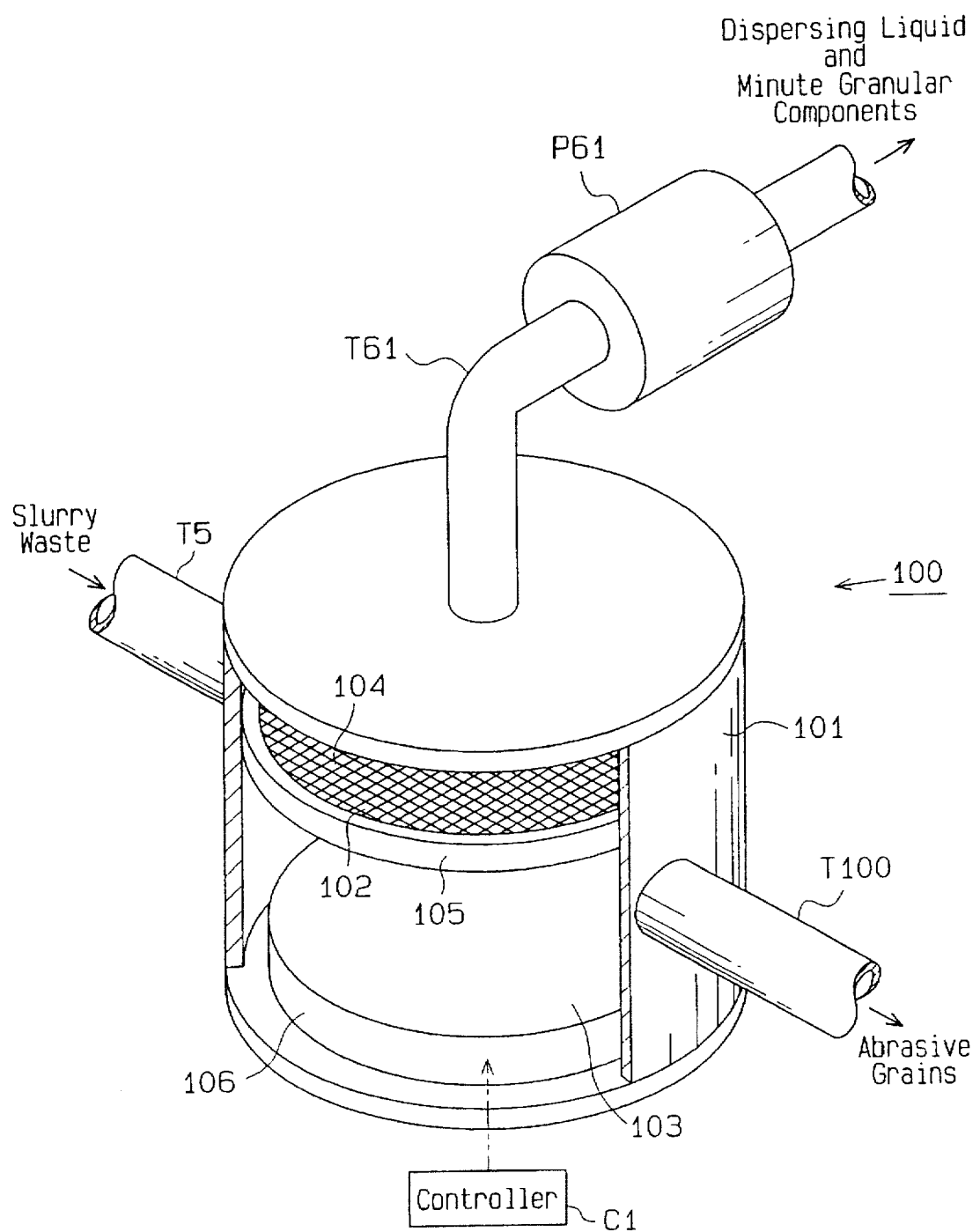
FIG. 9 is a partially cutaway perspective view showing the structure of the separating-recovering apparatus.

As shown in FIGS. 8 and 9, the pipe T5, through which slurry waste is conveyed from the waste tank 5 to the first chamber 103, has an outlet connected with the container 101. A pipe T100, through which slurry waste including the abrasive grains is conveyed from the first chamber 103, has an inlet connected with the container 101 and an outlet connected with the waste tank 5. A pipe T101 has an inlet connected with a mid-section of the pipe T100 and an outlet connected with an abrasive grain tank 108. A valve V101 is provided in the pipe T101.

The pipe T61, which dispersing liquid including the minute granular components are discharged through from the second chamber 104, has an inlet connected with the container 101 and an outlet connected with a filter 107, which serves as a second separating-recovering means. The pipe T61 is provided with the pump P61. The filter 107 is identical to the filter 7 employed in the first embodiment and separates minute granular components from the dispersing liquid to recover the liquid. A pipe T107, which is provided with a valve V107, connects the filter 107 to a dispersing liquid tank 109, in which the dispersing liquid is collected.

The operation of the fourth embodiment having the above structure will now be described. The valve V21 is first opened to supply a predetermined amount of abrasive grains into the mixing tank 2 from the hopper 21. The agitator 20 mixes the abrasive grains and the dispersing liquid to form slurry in the mixing tank 2. The mixed weight ratio of the abrasive grains and the dispersing liquid of the slurry mixed in the mixing tank 2 is set within the same range as the first embodiment. The mixed slurry is then supplied into the slurry tank 45 of the wire saw W as the valve V2 is opened.

The wire saw W cuts the workpieces 46 in the same manner as the first embodiment. More specifically, after the valves V2 and V41 are closed, the slurry in the slurry tank 45 is supplied to the wire group 41 through the supply pipes 43. In this state, each workpiece 46 is lowered from a position above the wire group 41 to a position below the wire group 41. The workpiece 46 is sliced into a plurality of wafers as it passes through the traveling wire group 11, to which abrasive grains are adhered.

During the cutting, the slurry supplied to the wire group 41 from the supply pipes 43 falls therefrom into the receiving tank 44. The slurry is then collected in the slurry tank 45 and sent back to the supply pipes 43 through the pipe T4. The slurry used to cut the workpiece 46 includes, for example, dispersing liquid having a viscosity of about 180 cP, abrasive grains having an average grain diameter of 5 to 30 micrometers, fragmented abrasive grains having an average grain diameter of 5 to 15 micrometers, cutting chips removed from the workpiece 46 having a grain diameter within the range of a submicron value to a few micrometers, and metal particles removed from the wire 40.

Further cutting of workpieces 46 gradually increases the amount of cutting chips and metal particles in the slurry.

This degrades the cutting capability of the slurry. Therefore, in the same manner as in the first embodiment, during the predetermined cycle of the cutting process (e.g., the second cycle), a portion of the used slurry in the slurry tank 45 is replaced with fresh slurry to regenerate the slurry.

The slurry waste discharged from the slurry tank 45 of the wire saw W is first collected in the waste tank 5. When the slurry waste reaches a predetermined amount, the valves V41, V101 are closed and the valves V5, V107 are opened. The pumps P5, P61 and the ultrasonic oscillator 106 are then activated. It is preferable that the pump P5 conveys the slurry waste at a pressure of about 0.5 kg/cm². It is also preferable that the pump P61 convey the dispersing liquid including the minute granular components at a flow rate of 1 to 2 liters per minute. It is also preferable that the ultrasonic oscillator 106 generate ultrasonic waves having a frequency of about 40 Hz.

Figure 10A:
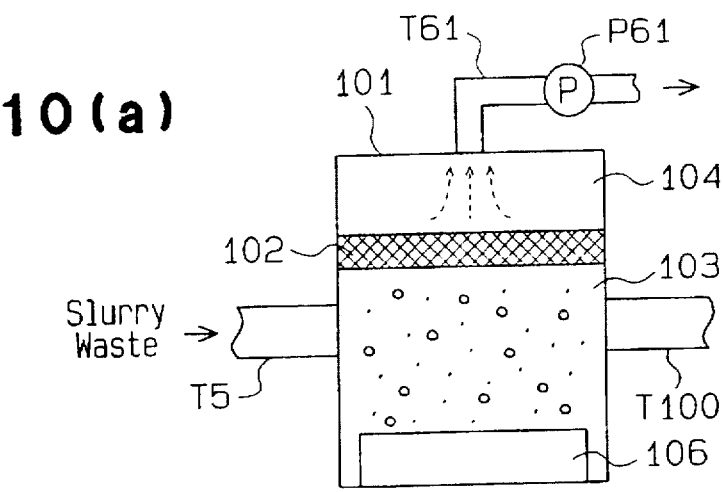
FIGS. 10(a), (b), (c) are schematic views showing the operation of the separating apparatus.

As shown in FIG. 10(a), activation of the pump P5 causes the slurry waste in the waste tank 5 to be sent to the first chamber 103 of the separating apparatus 100 through the pipe T5. When the slurry waste in the first chamber 103 reaches a predetermined amount, the pump P61 draws the dispersing liquid included in the slurry waste into the second chamber 104 through the filter 102, as shown by the arrowed broken lines in FIG. 10(a).

Figure 10B:
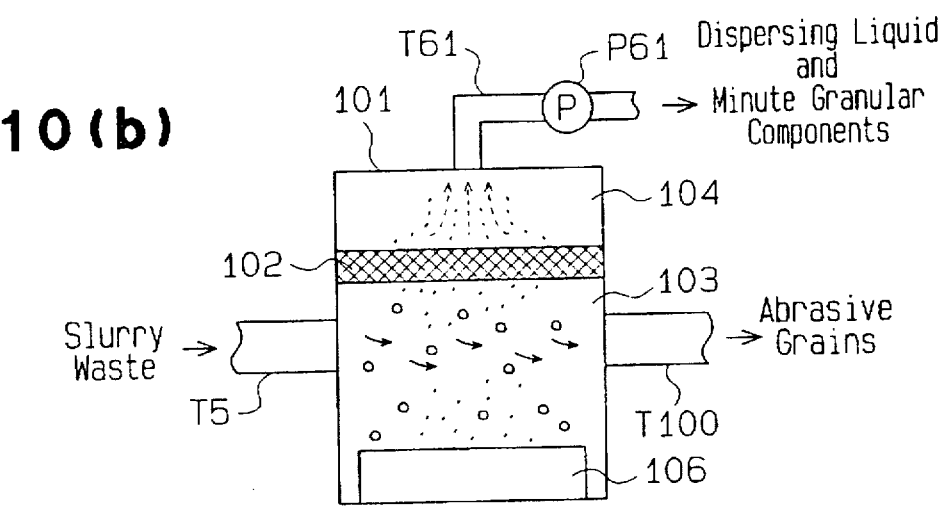

The pump P61 also draws the abrasive grains and minute granular components toward the filter 102. As shown in FIG. 10(b), minute granular components having a grain diameter that is smaller than the pores of the filter 102 pass through the filter 102 together with the dispersing liquid into the second chamber 104. Abrasive grains that have a grain diameter larger than the diameter of the pores in the filter 102 are restricted from passing through the filter 102 and thus remain in the first chamber 103. When the slurry waste in the first chamber 103 reaches a predetermined value, the abrasive grains are forced out into the pipe T100 together with the slurry waste and returned to the waste tank 5.

Figure 11:
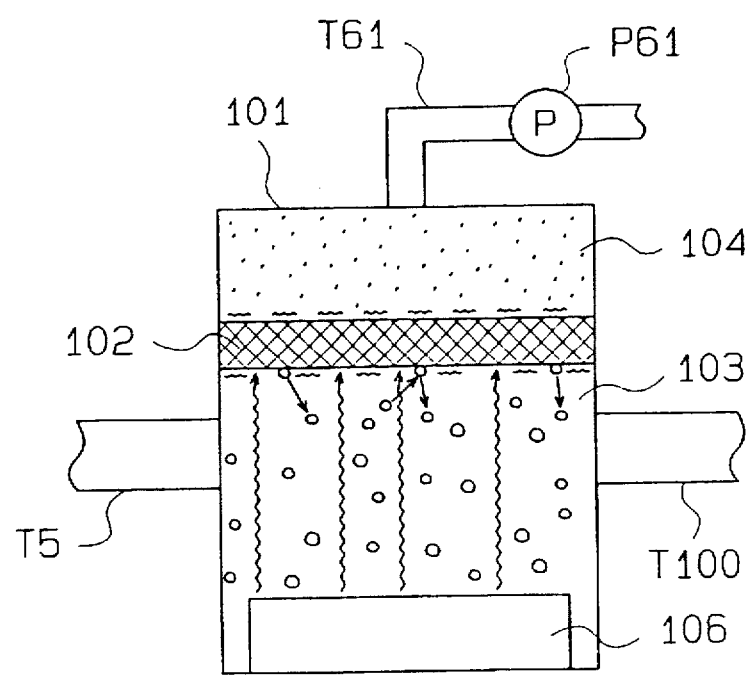
FIG. 11 is a schematic view showing the operation of the separating apparatus.

The ultrasonic waves generated by the ultrasonic oscillator 106 is transmitted to the filter 102 through the slurry waste in the first chamber 103. This vibrates the filter 102 with an extremely small amplitude. Accordingly, as shown in FIG. 11, the abrasive grains are shaken off the filter 102 and prevented from adhering thereon.

The minute granular components in the slurry waste that are smaller than the pores of the filter 102 may become trapped in the filter 102 as they pass therethrough since the filter 102 is constituted by superimposing a plurality of screens. However, the ultrasonic waves from the ultrasonic oscillator 106 shake out the trapped granular components and allow them to pass through the filter 102. This prevents the granular components from being trapped in the filter 102.

Since the minute granular components are prevented from adhering to the filter 102, the pores of the filter 102 are prevented from being clogged. Therefore, the minute granular components pass through the filter 102 smoothly enabling quick separation of the granular components.

Figure 10C:
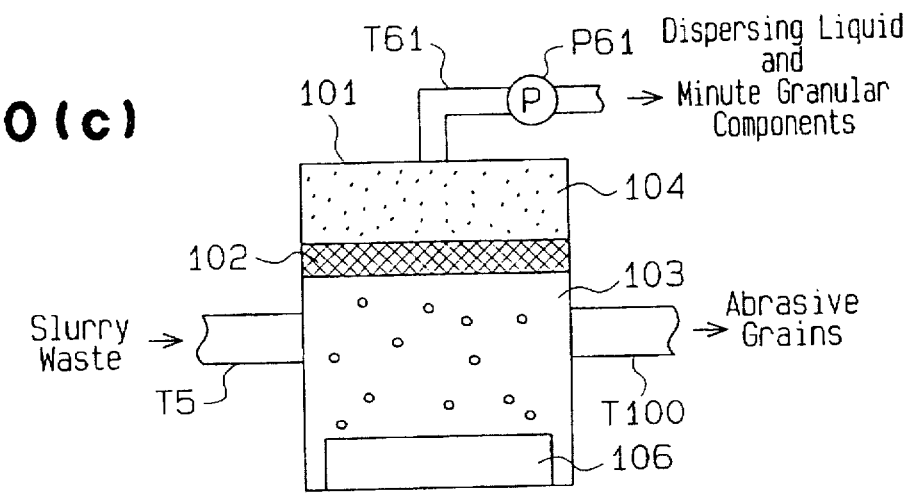

As described above, slurry waste circulates through a circulation passage defined along the waste tank 5, the pipe T5, the separating apparatus 100, and the pipe T100. As the slurry waste advances along the passage, the percentage content of the abrasive grains in the slurry waste, which is contained in the first chamber 103 of the separating apparatus 100, becomes larger while the percentage content of the minute granular components becomes smaller, as shown in FIG. 10(c). Therefore, after the circulation of the slurry waste is continued for a predetermined time period, the valve 101 is opened to convey the abrasive grains in the first compartment 103 toward the abrasive grain tank 108 through the pipe T101. This process is terminated when a predetermined time period elapses. Afterward, the ultrasonic oscillator 106 is deactivated.

The dispersing liquid including the minute granular components that passes through the filter 102 and enters the second chamber 104 is sent to the filter 107 through the pipe T61 by the pump P61. The filter 107 separates the cutting chips, fragmented abrasive grains, and metal particles from the dispersing liquid and thus recovers the liquid. The dispersing liquid recovered by the filter 107 is sent to the liquid tank 109 through the pipe T107.

The abrasive grains collected in the grain tank 108 and the dispersing liquid collected in the liquid tank 109 are conveyed to the mixing tank 2. As shown by the double-dashed broken line in FIG. 8, the abrasive grains in the grain tank 108 and the dispersing liquid in the liquid tank 109 may be transferred to the mixing tank 2 through the first pipe T6 and the second pipe T7 in the same manner as the first embodiment. The system may be designed such that the recovered abrasive grains and dispersing liquid are transferred manually to the mixing tank 2. Furthermore, the transferring may be carried out continuously or intermittently.

In the same manner as in the first embodiment, the opening of the valves V21, V22 is controlled based on the values detected by the specific gravity meter S1 and the viscosity meter S2. This enables adjustment of the amount of abrasive grains fed from the hopper 21 and the amount of dispersing liquid supplied from the liquid tank 22. As a result, the mixed weight ratio of the abrasive grains and the dispersing liquid in the slurry is adjusted so that it is constantly maintained within the range of 1:0.91 to 1:0.6 if the liquid is composed of oil, and within the range of 1:0.76 to 1:0.5 if the liquid is composed of water.

In the fourth embodiment, the filter 102 is vibrated by the ultrasonic waves generated by the ultrasonic oscillator 106 when separating the minute granular components from the slurry waste. This suppresses clogging of the filter 102 and suppresses degradation of the straining function of the filter 102. Accordingly, minute granular components may be readily and efficiently separated to recover the abrasive grains even when slurry having a high viscosity is used.

The separating apparatus 100 is constituted mainly by the container 101, the filter 102, and the ultrasonic oscillator 106. Such structure of the separating apparatus 100 is simpler than the decanter 6 of the first embodiment. Thus, the production costs are lower. Accordingly, this contributes to a decrease in the production cost of the entire system.

The diameter of the pores in the filter 102 and the flow rate of the dispersing liquid passing through the filter 102 may be adjusted to adapt the separating apparatus 100 to the size and amount of the subject to be separated or in accordance with the processing capacity of the system. Thus, the system may be rearranged flexibly. The advantageous effects obtained in the above embodiments are also obtained in this embodiment.

The ultrasonic oscillator 106 may be activated continuously or intermittently when the minute granular components are separated from the slurry waste.

The length of time during which slurry waste circulates through the circulation passage defined along the waste tank 5, the pipe T5, the separating apparatus 100, and the pipe T100 may be varied in accordance with the target recovery rate and percentage content of the abrasive grains, or the like. The structure of the system may also be designed so as to convey the slurry waste that includes the abrasive grains directly to the grain tank 108 without returning it to the waste tank 5.

Fifth Embodiment

Figure 12:
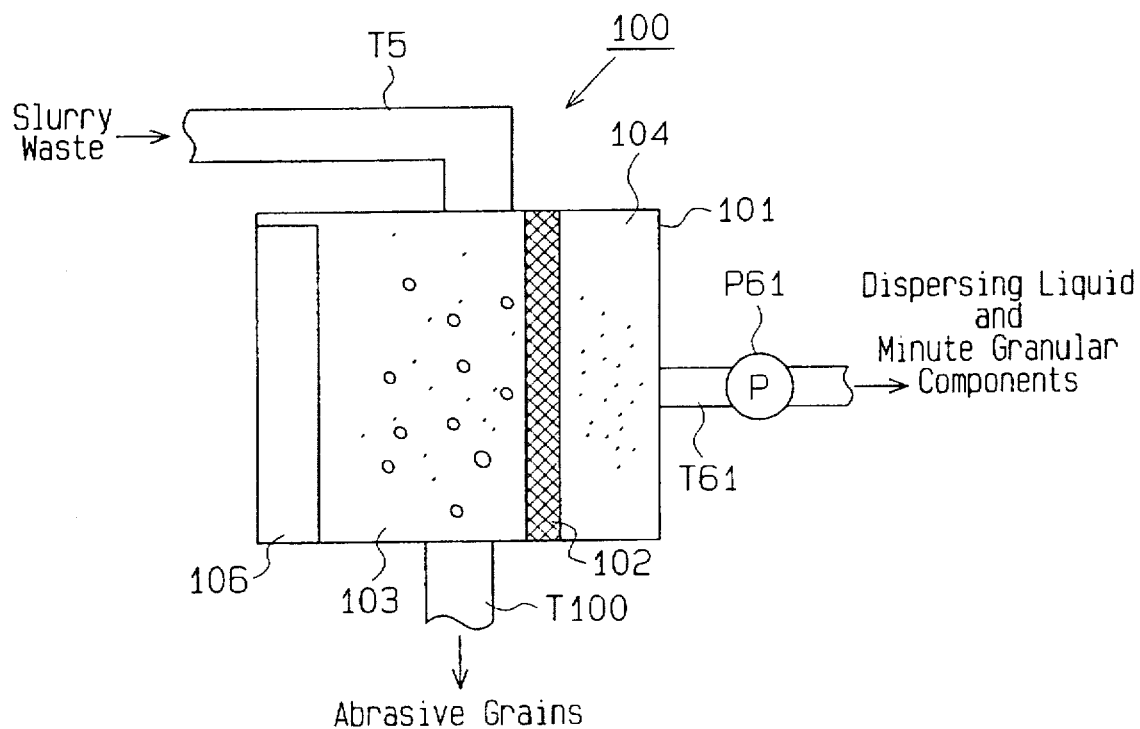
FIG. 12 is a diagrammatic view of the separating apparatus employed in a fifth embodiment according to the present invention.

A fifth embodiment according to the present invention will hereafter be described with reference to FIG. 12.

The fifth embodiment is a modification of the separating apparatus 100 employed in the fourth embodiment. As shown in FIG. 12, the separating apparatus of the fifth embodiment is arranged sideward. More specifically, the filter 102 partitions the interior of the container 101 so as to define the first chamber 103 and the second chamber 104 at the left and right sides of the filter 102. The pipe T5, through which slurry waste is supplied into the first chamber 103, is connected to the upper side of the container 101. The pipe T100, from which slurry waste including the abrasive grains in the first chamber 103 is discharged, is connected to the lower side of the container 101.

In the fifth embodiment, the slurry waste from the waste tank 5 may be drawn into the pipe T100 through the first chamber 103 by using the pump P5 or by allowing gravitational force to pull the slurry toward the pipe T100.

Sixth Embodiment

Figure 13:
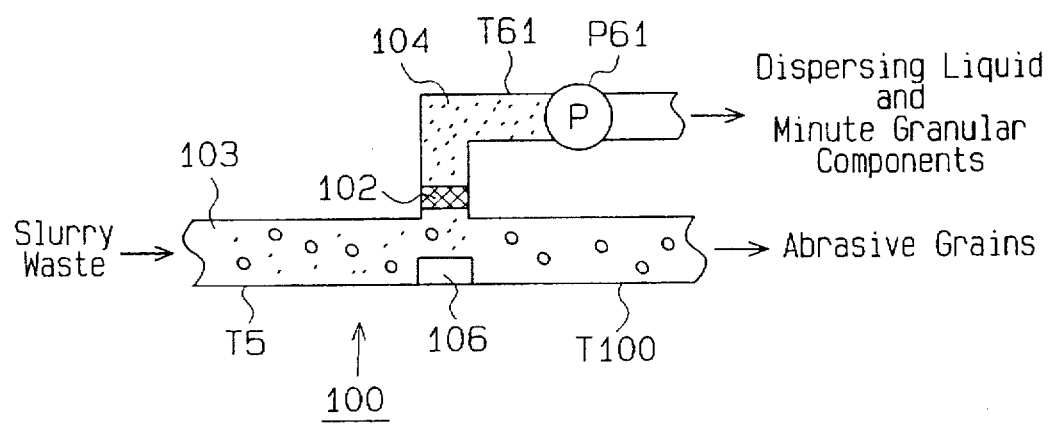
FIG. 13 is a diagrammatic view of the separating apparatus employed in a sixth embodiment according to the present invention.

A sixth embodiment according to the present invention will hereafter be described with reference to FIG. 13.

The sixth embodiment is a modification of the separating apparatus 100 employed in the fourth embodiment. As shown in FIG. 13, the separating apparatus 100 of the sixth embodiment has a body which is constituted by the pipe T5 and the pipe T61, which extends from the pipe T5. The filter 102 is arranged in the pipe T61. The ultrasonic oscillator 106 is arranged in the pipe T5 at a position opposed to the filter 102. The section of the pipe T5 downstream from the intersection with the pipe T61 serves as the pipe T100, which abrasive grains are discharged through. The section of the pipe T5 upstream from the intersection with the pipe T61 serves as the first chamber 103. The section of the pipe T61 downstream from the filter 102 serves as the second chamber 104.

The slurry waste in the waste tank 5 is sent to the pipe T5 through the pipe T5 by the pump P5. The pump P61 then draws the dispersing liquid and the minute granular components through the filter 102 and into the pipe T61. The slurry waste including the abrasive grains is discharged into the pipe T100.

Seventh Embodiment

Figure 14:
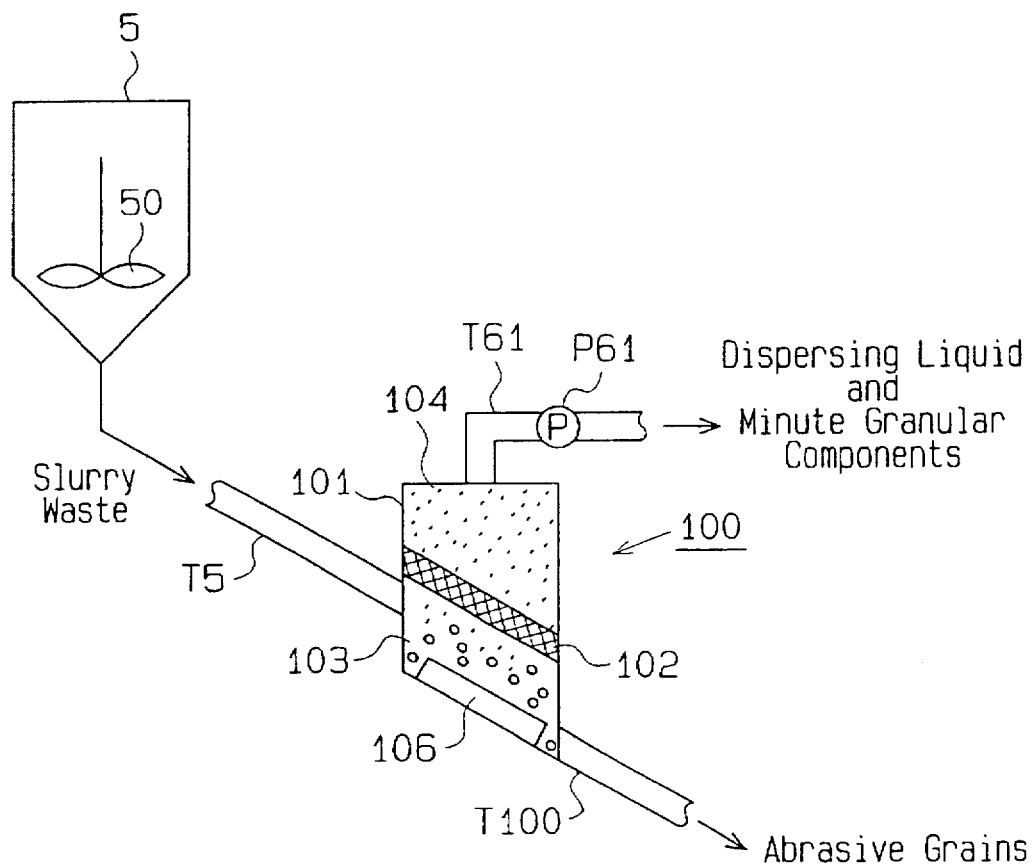
FIG. 14 is a diagrammatic view of the separating apparatus employed in a seventh embodiment according to the present invention.

A seventh embodiment according to the present invention will hereafter be described with reference to FIG. 14.

The seventh embodiment is a modification of the separating apparatus 100 employed in the fourth embodiment. As shown in FIG. 14, the separating apparatus 100 of the seventh embodiment is located at a position lower than the waste tank 5. The pipe T5 connecting the waste tank to the separating apparatus 100 is inclined downward. The pipe T100, the bottom of the first chamber 103, the ultrasonic oscillator 106, and the filter 106 are all inclined downward in the same manner as the pipe T5.

Gravitational force pulls the slurry waste in the waste tank 5 into the first chamber 103 through the pipe T5 and then out of the chamber 103 into the pipe T100. The slurry waste may also be drawn into the pipe T100 from the first chamber 103 by the pump P5.

Eighth Embodiment

Figure 15:
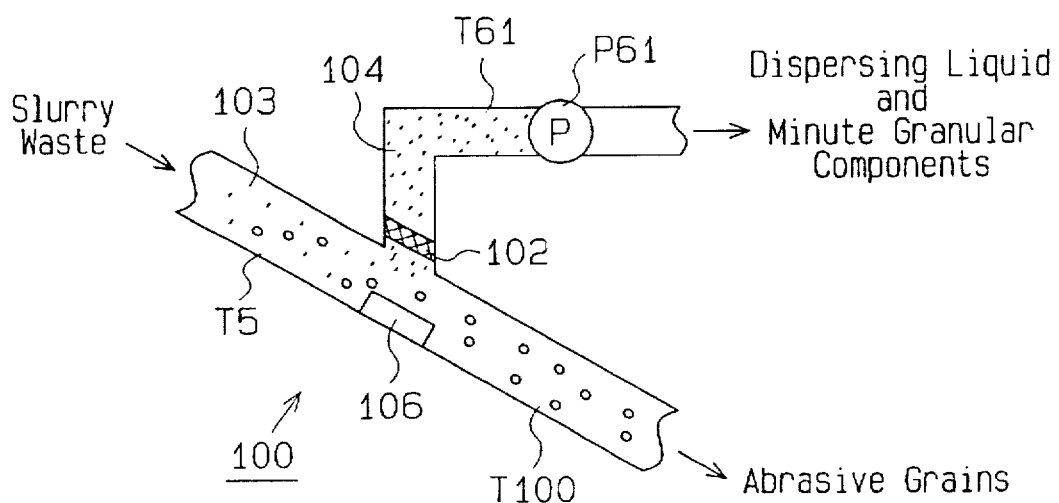
FIG. 15 is a diagrammatic view of the separating apparatus employed in an eighth embodiment according to the present invention.

An eighth embodiment according to the present invention will hereafter be described with reference to FIG. 15.

The eighth embodiment is a combination of the separating apparatus 100 employed in the sixth and seventh embodiments. As shown in FIG. 15, the structure of the separating apparatus 100 employed in the eighth embodiment is basically the same as that employed in the sixth embodiment. This embodiment differs from the sixth embodiment in that the pipe T5 is inclined downward from the waste tank 5 to the separating apparatus 100. As in the same manner as the seventh embodiment, gravitational force pulls the slurry waste in the waste tank 5 into the first chamber 103 through the pipe T5 and then out of the chamber 103 into the pipe T100.

Ninth Embodiment

A ninth embodiment according to the present invention will hereafter be described with reference to FIGS. 16 to 18. Parts identical to those used in the first embodiment will be denoted with the same numerals and will not be described.

The abrasive grains included in the slurry scatter during cutting and adhere to various parts of the wire saw. Therefore, the wire saw is washed periodically by a washing liquid. However, during the washing, the abrasive grains adhered to the wire saw are disposed of together with the washing liquid. This necessitates replacing the lost abrasive grains and increases the amount of abrasive grains required for cutting. As a result, the running cost increases due to the expensive abrasive grains.

The ninth embodiment recovers the abrasive grains included in the washing liquid after washing the wire saw and recycles the abrasive grains so as they may be used for cutting. As shown in FIG. 16, the hopper 21, which feeds abrasive grains to the mixing tank 2, is connected to the tank 2 by the screw feeder 21a and the pipe T21, which is provided with the valve V21. The dispersing liquid tank 22, which supplies dispersing liquid to the mixing tank 2, is connected to the tank 2 by the pipe T22, which is provided with the valve V22. The dispersing liquid is composed of liquids such as water or oil. The specific gravity meter S1 and the viscosity meter S2 are arranged in the mixing tank 2 to measure the specific gravity and viscosity of the slurry. The controller C1 transmits command signals to control the opening of the valves V21, V22 based on the values detected by the specific gravity meter S1 and the viscosity meter S2.

The mixing tank 2 is connected to the slurry tank 45 of the wire saw W by the pipe T2, which is provided with the valve V22. The number of wire saws is not restricted and is arbitrary. The wire saw W has a structure which is identical to the structure of the wire saws W1–W4 employed in the first embodiment. Thus, identical parts will be denoted with the same numeral as in the first embodiment and therefore will not be described here.

Figure 17:
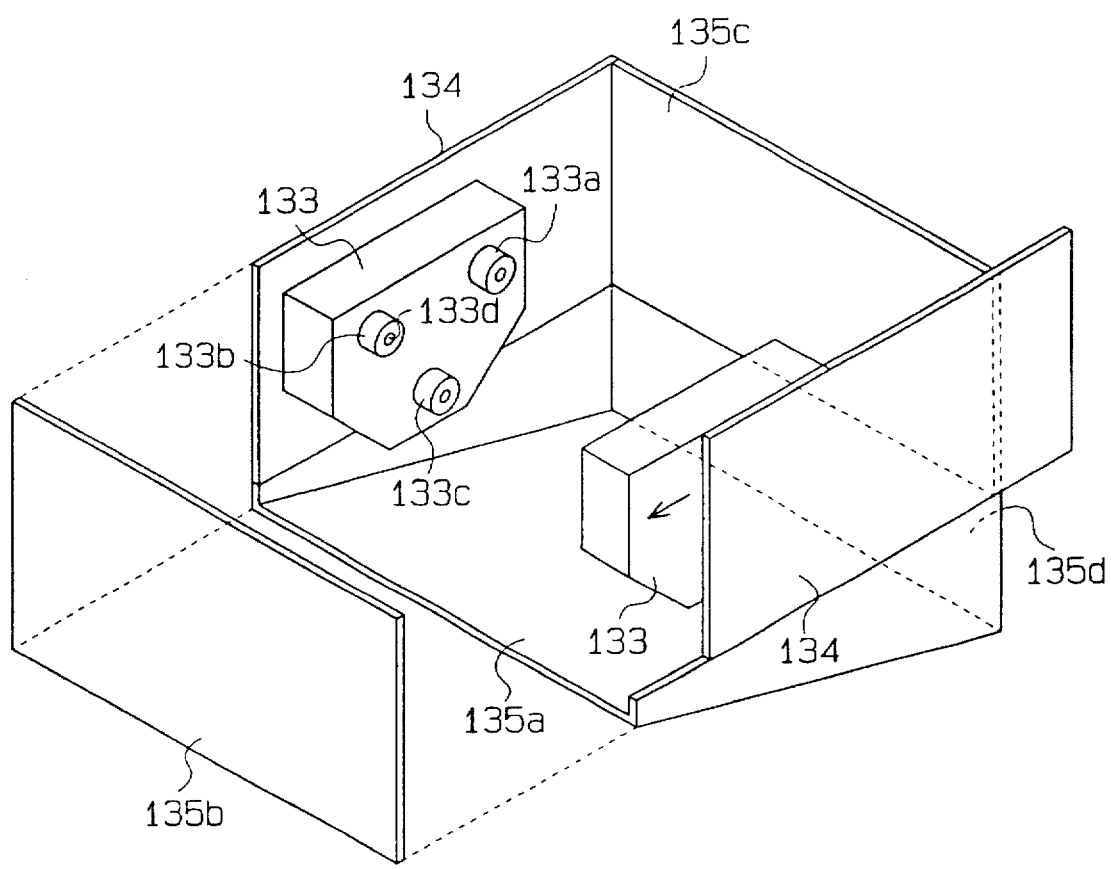
FIG. 17 is a perspective view showing the structure of the shutters and the support units employed in the wire saw.
Figure 18:
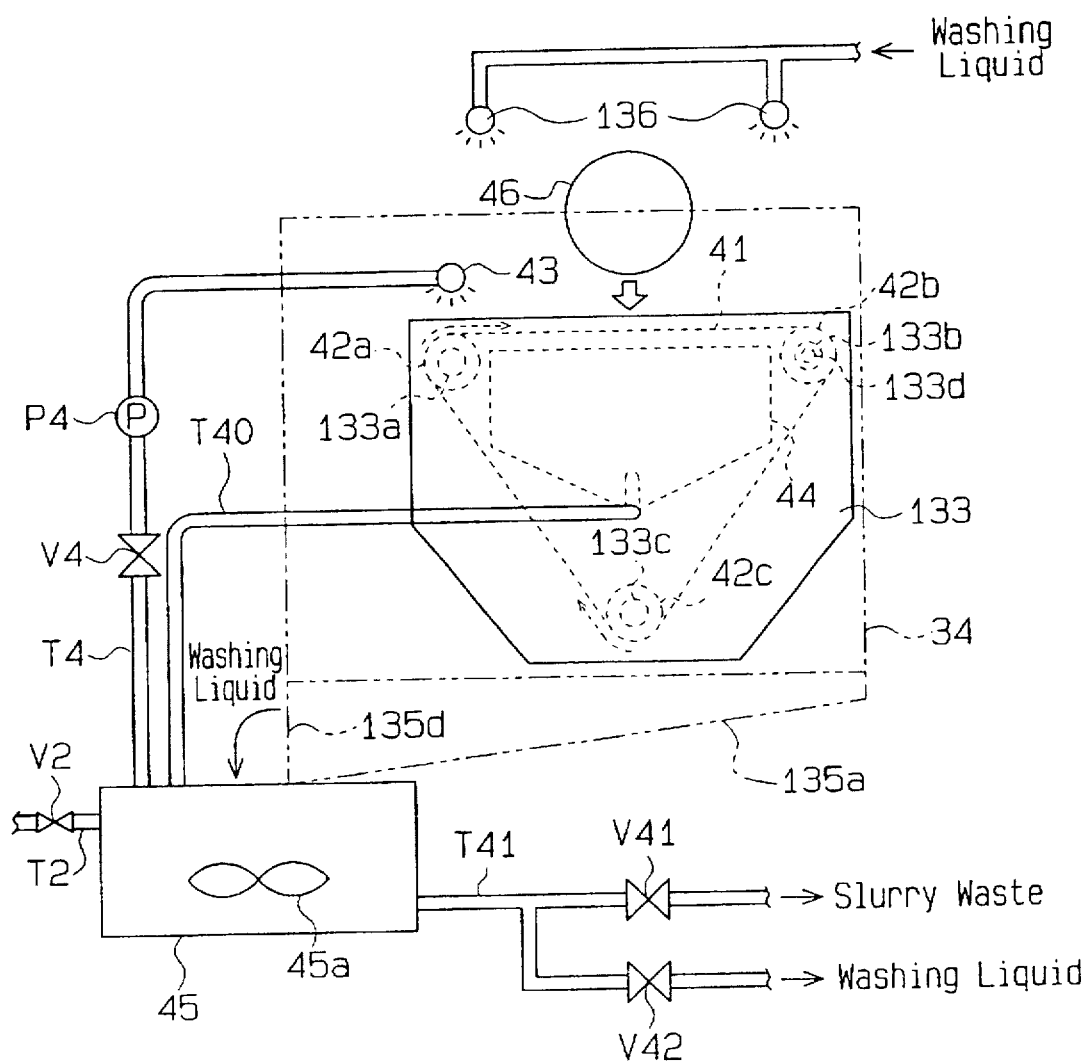
FIG. 18 is a schematic view showing the wire saw and its peripheral structure.
Figure 19:
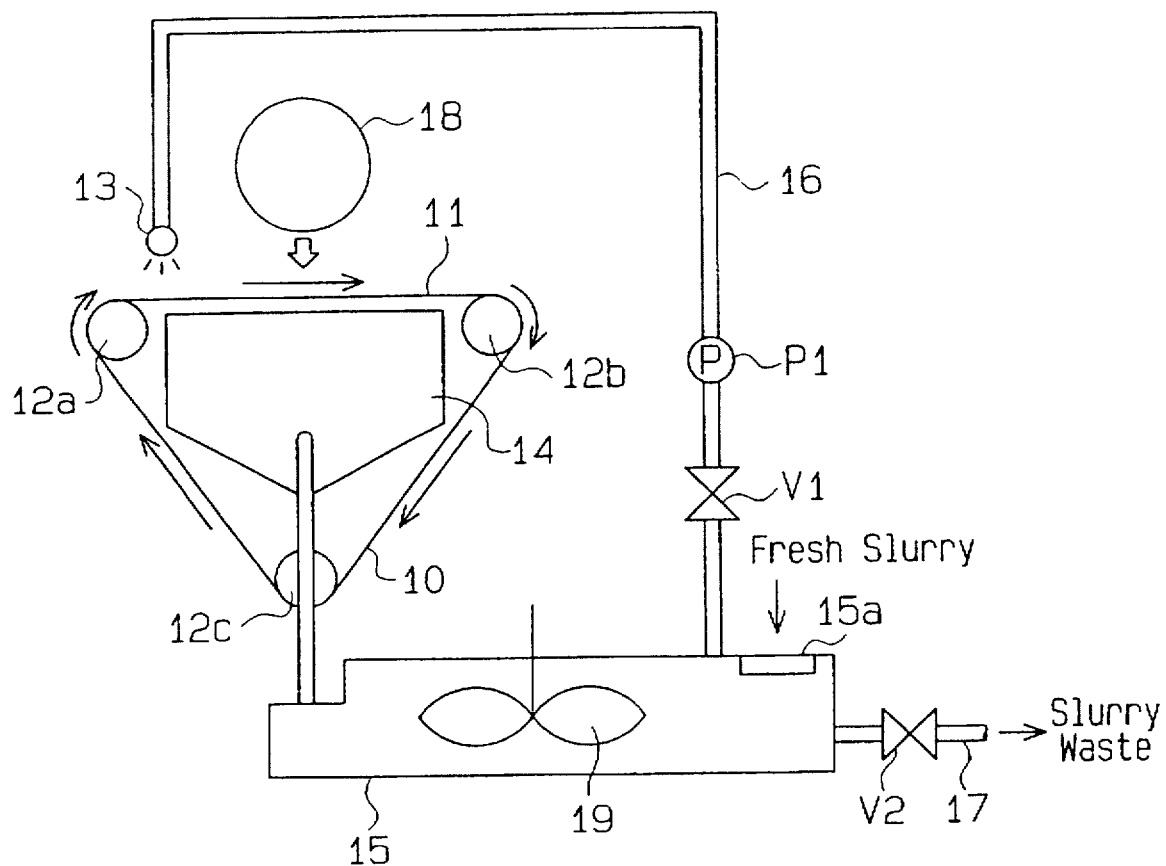
FIG. 19 is a diagrammatic view showing a prior art wire saw and its peripheral structure.

As shown in FIGS. 17 and 18, the wire saw W has a pair of support units 133 that are fixed to a frame (not shown). Each of the support units 133 includes three supporters 133a, 133b, 133c. The wire saw W has three rollers 42a, 42b, 42c which are supported rotatably by the supporters 133a, 133b, 133c, respectively, between the two support units 133. The supporter 133b of one of the support units 133 also functions as the drive shaft 133d and is connected to the roller 42b, which is supported by the supporter 133b. The roller 42b is rotated by the drive shaft 133d, which is driven by a motor (not shown). The rotation of the roller 42b is transmitted to the other rollers 42a, 42c through the wire 40.

A receiving plate 135a, which receives the washing liquid after it washes the various parts of the wire saw W, is inclined downward with respect to the rear side of the wire saw W (left side as viewed in FIG. 18). The sides of the receiving plate 135a are bent upward and the upper edge of the bent section extends horizontally. A pair of shutters 134 are each supported slidably in the horizontal direction on the upper edge of one of the bent sections. The shutters 134 are arranged at the sides of the wire saw W so as to surround the support units 133.

A front plate 135b is arranged at the front side of the receiving plate 135a. The front plate 135b is supported so that it moves freely toward and away from the receiving plate 135a to close and open the front side. A rear plate 135c is arranged at the rear side of the receiving plate 135a. The vertical length of the rear plate 135c is the same as that of the shutters 134. The rear plate 135c is arranged so that its upper edge extends along an imaginary plane defined by connecting the upper edges of the shutters 134. An opening 135d, through which washing liquid is discharged, is defined between the rear plate 135c and the receiving plate 135a. The shutters 134, the receiving plate 135a, the front plate 135b, and the rear plate 135c encompass the machining area of the wire saw W.

Washing pipes 136 are provided above the shutters 134. The washing liquid is injected through holes (not shown) that are provided in the bottom of each pipe 136. The slurry tank 45 is arranged so as to collect the washing liquid discharged through the opening 135d. The slurry in the slurry tank 45 and the washing liquid in the slurry tank 45 are discharged through the pipe T41 into the slurry waste tank 5 and washing liquid tank 137, respectively.

Figure 16:
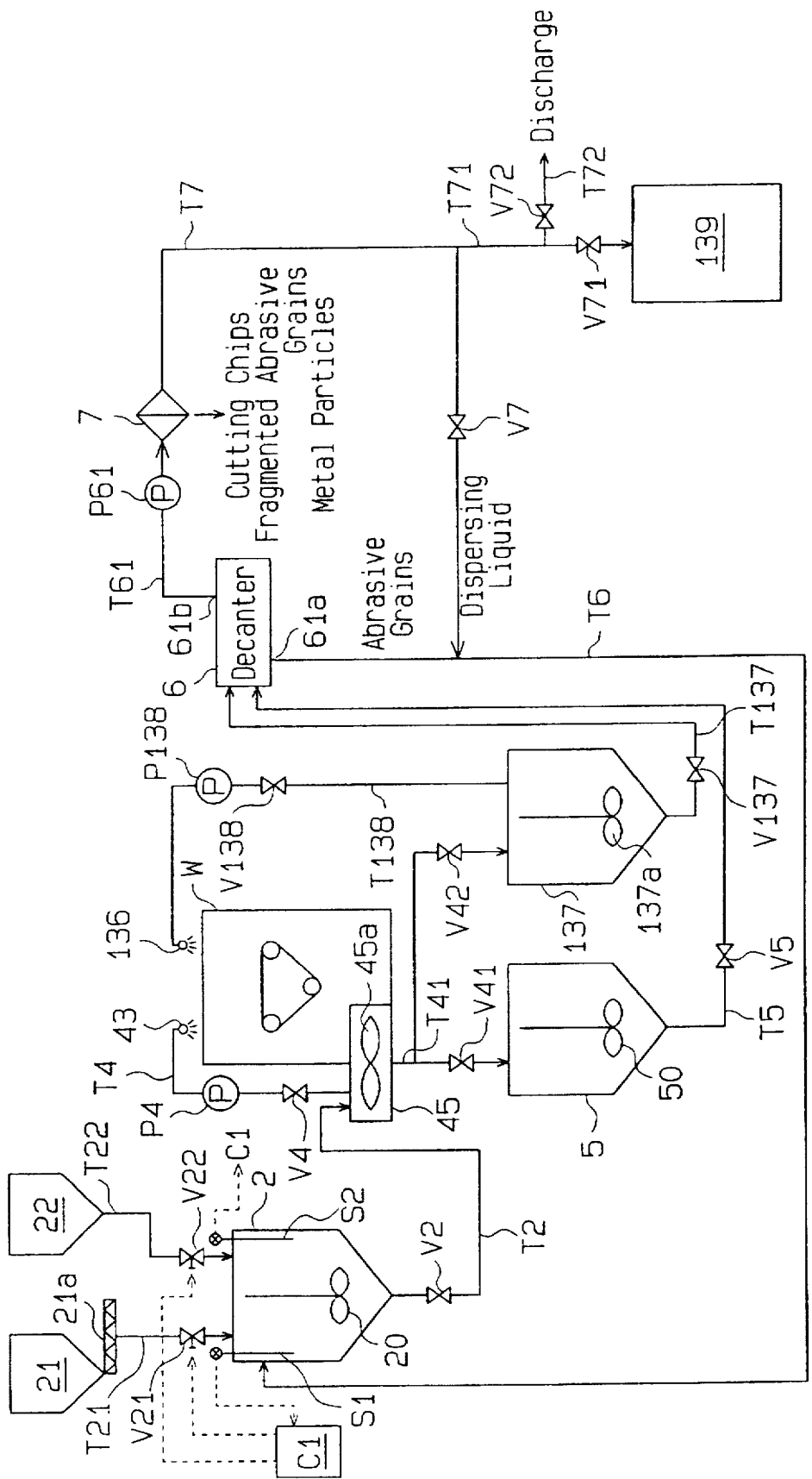
FIG. 16 is a schematic view showing the structure of a slurry managing system according to a ninth embodiment of the present invention.

As shown in FIG. 16, the pipe T41 includes a single inlet connected with the slurry tank 45 and two outlets, one connected to the waste tank 5 and the other to the washing liquid tank 137. The pipe T41 is provided with valves V41, V42. The valve V41 corresponds to the waste tank 5 and the valve V42 corresponds to the washing liquid tank 137. An agitator 137a is arranged in the washing liquid tank 137. The waste tank 5 is connected to the decanter 6, which serves as the first separating-recovering means, by the pipe T5, which is provided with the pump P5. The structure of the decanter 6 is the same as that of the first embodiment. The washing liquid tank 137 is connected to the washing pipes 136 by a pipe T138, which is provided with a valve V138 and a pump P138.

The decanter 6 has an abrasive grain discharge port 61a which is connected to the mixing tank 2 through the first pipe T6. The abrasive grains collected in the decanter 6 is conveyed to the mixing tank 2 through the first pipe T6. In the same manner as the first embodiment, the outlet 61b of the decanter 6 is connected to the filter 7, which serves as the second separating-recovering means. The structure of the filter 7 is the same as that of the first embodiment. The filter 7 is connected to the first pipe T6 by the second pipe T7, which is provided with the valve V7. A portion of the dispersing liquid recovered by the filter 7 is conveyed to the mixing tank 2 through the second pipe T7. A cyclone may be employed as the first separating-recovering means and a decanter may be used as the second separating-recovering means.

The second pipe T7 is connected to a pipe T71 that is further connected with a dispersing liquid tank 139. A valve V71 is provided in the pipe T71. A pipe T72 is connected to a mid-section of the pipe T71. A valve V72 is provided in the pipe T72.

The operation of the ninth embodiment will now be described. The dispersing liquid employed here is composed of water.

In the same manner as the first embodiment, the slurry is mixed in the mixing tank 2. The mixed weight ratio of the abrasive grains and the dispersing liquid in the slurry mixed in the tank 2 is set within the same range as the first embodiment. The mixed slurry is supplied to the slurry tank 45 of the wire saw W when the valve V2 is opened.

The wire saw W cuts each workpiece 46 in the same manner as the first embodiment. More specifically, when the valve V4 is opened and the valves V2, V41, V42 are closed, the slurry in the slurry tank 45 is supplied to the wire group 41 through the supply pipes 43. In this state, the workpiece 46 is lowered through the traveling wire group 41 and sliced into a plurality of wafers as it passes therethrough.

After a predetermined number of cutting cycles are performed on the workpieces 46, a portion of the slurry in the slurry tank 45 is replaced and thus regenerated in the same manner as the first embodiment.

The slurry waste discharged from the slurry tank 45 of the wire saw W is first collected in the waste tank 5 and then sent to the decanter 6. The decanter 6 separates the dispersing liquid and granular components that are smaller than the abrasive grains from the slurry waste to recover the abrasive grains. The recovered abrasive grains are sent to the first pipe T6. The dispersing liquid including the minute granular components are sent to the filter 7 through the pipe T61. The filter 7 separates the minute granular components from the dispersing liquid and recovers the dispersing liquid. A portion of the recovered dispersing liquid is returned to the mixing tank 2 together with the abrasive grains through the second pipe T7 and the first pipe T6 when the valve V7 is opened and the valves V71, V72 are closed. The remaining dispersing liquid is sent to the dispersing liquid tank 139 through the pipe T71 when the valve V71 is opened and the valves V7, V72 are closed.

When each of the workpieces 46 are cut, the slurry is scattered toward the inner sides of the shutters 134, the receiving plate 135a, the front plate 135b, the rear plate 135c, and toward the support units 133 and the rollers 42a–42c. The scattered slurry dries as time elapses and the abrasive grains included therein adhere to these parts. Further cutting causes the abrasive grains to accumulate gradually. Therefore, the wire saw W is washed periodically, for example, after a predetermined number of cutting cycles are performed.

The washing is performed by opening the valves V42, V138, and closing the valves V2, V4, V41. In this state, the pump P138 sends the washing liquid (e.g., water) in the washing liquid tank to the washing pipes 136 through the pipe T138. The water is injected in a shover-like manner from the washing pipes 136 toward the inner sides of the shutters 134, the support units 133, the rollers 42a–42c, etc. This washes off the scattered slurry and the abrasive grains from these parts.

The abrasive grains washed off from the various parts fall onto the receiving plate 135a together with the washing liquid. The washing liquid including the abrasive grains flows along the inclined surface of the receiving plate 135a through the opening 135d into the slurry tank 45. The washing liquid collected in the slurry tank 45 is sent to the washing liquid tank 137 through the pipe T41. When the washing liquid in the washing liquid tank 137 reaches a predetermined amount, the valve V137 is opened to release and send the washing liquid in the tank 137 to the decanter 6. The decanter 6 separates washing liquid and the granular components that are smaller than the abrasive grains from the washing liquid and recovers the abrasive grains. The abrasive grains are discharged into the first pipe T6. The washing liquid including the minute granular components is sent to the filter 7 through the pipe T61. The filter 7 separates the minute granular components from the washing liquid and recovers the washing liquid. A portion of the recovered washing liquid (e.g., an amount of washing liquid that is required to convey the abrasive grains through the first pipe T6) is sent to the first pipe T6 through the second pipe T7 by opening the valve V7 and closing the valves V71, V72.

Accordingly, the abrasive grains in the first valve T6 is sent to the mixing tank 2 together with the washing liquid. The remaining washing liquid is discharged from the pipe T72 by opening the valve V72 and closing the valves V7, V71.

In the above manner, the cutting process of the workpieces 46 and the washing process of the wire saw W is alternately repeated. Abrasive grains are recovered in each cycle of the cutting and washing processes. The recovered abrasive grains, the dispersing liquid, the washing liquid, the newly added abrasive grains and dispersing liquid are mixed in the mixing tank 2 to obtain fresh slurry. In the same manner as the first embodiment, the opening of the valves V21, V22 is controlled based on the values detected by the specific gravity meter S1 and the viscosity meter S2, which are arranged in the tank 2. This adjusts the amount of abrasive grains fed from the hopper 21 and the amount of dispersing liquid supplied by the dispersing liquid tank 22. As a result, the mixed weight ratio of the abrasive grains and the dispersing liquid, composed of water in this embodiment, in the slurry mixed in the slurry tank 2 is adjusted within a range of 1:0.76 to 1:0.5.

By composing the dispersing liquid of the slurry from water, the abrasive grains adhered to parts such as the shutters 134 are easily washed off by the washing liquid, which is also composed of water. Furthermore, the area in which the slurry scatters is restricted by the shutters 134, etc. Thus, the washing process of the wire saw W may be performed within a restricted area. Additionally, costs are saved by using water, which is inexpensive. Dispersing liquid composed of water scatters more easily and causes a larger amount of abrasive grains to be adhered to various parts in comparison with dispersing liquid composed of oil. However, the washing is performed more efficiently when using dispersing liquid composed of water in comparison with dispersing liquid composed of oil.

The abrasive grains recovered from the washing liquid used to wash the wire saw W are recycled and employed to cut the workpieces 46. This reduces the cost of the cutting process. Furthermore, the washing is carried out within the slurry scattering area restricted by the shutters 134 etc. Since the abrasive grains that adhere to the various parts of the wire saw W are restricted within the scattering area, the abrasive grains may easily be recovered. This results in an improvement in the recovery rate of the abrasive grains. The washing liquid is composed of water or oil, which is also the main constituent of the dispersing liquid. This enables the abrasive grains recovered by the decanter 6 to be conveyed to the mixing tank 2 by the washing liquid.

The ninth embodiment may be applied to a system that employs slurry including a dispersing liquid composed of oil. In this case, machine oil is used as the washing liquid to wash the wire saw W. The decanter 6 separates and recovers the abrasive grains from the machine oil and sends the abrasive grains to the mixing tank 2 together with the dispersing liquid. This structure also allows the expensive abrasive grains, which are not recovered during cutting, to be recovered and saves costs. If oil is used for the dispersing liquid, the mixed weight ratio of the abrasive grains and the dispersing liquid in the slurry so that it is maintained within the range of 1:0.91 to 1:0.6.

Instead of conveying both the abrasive grains and the washing liquid to the mixing tank 2, the system may be constructed to send only the abrasive grains to the tank 2. The system may also be constructed to collect the recovered abrasive grains at a predetermined section and then send them to the mixing tank 2.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope of the appended claims.

What is claimed is:

1. A slurry managing system for a wire saw including a wire that has a plurality of wire lines extending in parallel to one another, wherein said wire is supplied with slurry containing abrasive grains in dispersing liquid to cut a workpiece so as to simultaneously produce a multiplicity of wafers, said system comprising:

mixer means for mixing the slurry prior to supplying of the slurry to the wire saw;

first supplying means for supplying the grains to the mixer means;

second supplying means for supplying the dispersing liquid to the mixer means;

first adjusting means for adjusting the amount of the grains supplied to the mixer means from the first supplying means;

second adjusting means for adjusting the amount of the liquid supplied to the mixer means from the second supplying means;

said wire saw being arranged to discharge the slurry used to cut the workpiece, said discharged slurry including particle components smaller than the grains;

separating means for separating the particle components from the slurry to collect a mixture of the dispersing liquid and the grains from the slurry discharged from the wire saw; and transferring means for transferring the collected mixture to the mixer means, wherein said mixer means is arranged to mix new slurry with the collected mixture.

2. The system as set forth in claim 1 further comprising:

said liquid including one of oil and water; and control means for controlling the first adjusting means and the second adjusting means to maintain the mixed weight ratio of the abrasive grains and the liquid including the oil within a range between 1:0.91 to 1:0.6 and mixed weight ratio of the abrasive grains and the liquid including the water within a range between 1:0.76 to 1:0.5 when the mixer means mixes the slurry.

3. The system as set forth in claim 2, wherein said abrasive grains have an average diameter of 5–30 micrometers.

4. The system as set forth in claim 1 further comprising a plurality of said wire saws each of which is supplied with the slurry mixed by the mixer means.

5. The system as set forth in claim 2 further comprising:

detecting means for detecting ratio of the grains contained in the slurry; and said control means controlling the first adjusting means and the second adjusting means based on the detected ratio.

6. The system as set forth in claim 5, wherein said detecting means detects the ratio of the grains contained in the slurry in the mixer means.

7. The system as set forth in claim 6, wherein said detecting means includes at least one of means for measuring specific gravity of the slurry and means for measuring viscosity of the slurry.

8. The system as set forth in claim 1, wherein said collected grains used to mix the slurry have an average diameter in a range of 5–30 micrometers.

9. The system as set forth in claim 1, wherein said separating means includes:

first parting means for parting a mixture of the particle components and the dispersing liquid from the slurry to collect the grains contained in the slurry discharged from the wire saw; and second parting means for parting the particle components from the mixture to collect the dispersing liquid contained in the mixture.

10. The system as set forth in claim 1, wherein said separating means includes means for applying centrifugal force to separate components from each other, wherein said applying means applies centrifugal acceleration of 150–500 G to the slurry.

11. The system as set forth in claim 1, wherein said separating means includes a filter.

12. The system as set forth in claim 1, wherein said separating means includes a cyclone for generating a spiral stream, wherein said stream circularly moves the slurry to separate components from each other.

13. The system as set forth in claim 9, wherein said first parting means includes a filter for collecting the grains and allowing passage of the dispersing liquid and the particle components therethrough.

14. The system as set forth in claim 13, wherein said first parting means includes vibrating means for vibrating the filter, and wherein the grains contacting the filter are removed from the filter by the vibration.

15. The system as set forth in claim 14, wherein said first parting means further includes a main body having a first chamber and a second chamber separated from the first chamber by the filter, wherein the slurry discharged from the wire saw is introduced to the first chamber, and wherein the dispersing liquid and the particle components are introduced to the second chamber from the first chamber through the filter and the grains are caught by the filter and remain in the first chamber.

16. The system as set forth in claim 14, wherein said vibrating means includes an ultrasonic vibrator for generating ultrasonic wave to vibrate the filter.

17. The system as set forth in claim 15, wherein said vibrating means includes an ultrasonic vibrator for generating ultrasonic wave to vibrate the filter, and wherein said ultrasonic vibrator is disposed opposite to the filter in the first chamber.

18. The system as set for in claim 15 further comprising:

an introducing passage for introducing the slurry from the wire saw to the first chamber;

a first drain passage for discharging the grain from the first chamber to collect the grain contained in the slurry remaining in the first chamber; and a second drain passage for discharging the dispersing liquid and the particle components from the second chamber.

19. The system as set forth in claim 18 further including feeding means for forcibly feeding the slurry from the introducing passage to the first chamber.

20. The system as set forth in claim 19 further comprising means for drawing the dispersing liquid and the particle components from the first chamber toward the second chamber through the filter.

21. The system as set forth in claim 18, wherein said transferring means includes:

first transferring means for transferring the grains from the first drain passage to the mixer means; and second transferring means for transferring the dispersing liquid collected by the second parting means to the mixer means, wherein the second transferring means is connected to the first transferring means to mix the dispersing liquid with the grains passing through the first transferring means.

22. The system as set forth in claim 1 further comprising:

washing means for washing the wire saw with the washing liquid to removing the slurry attached to the wire saw at the time of cutting of the workpiece, said washing liquid used for the washing includes the grains;

wherein said separating means separates the grains from the washing liquid used for the washing; and wherein said transferring means transfers the separated grains to the mixer means.

23. The system as set forth in claim 22, wherein said washing liquid includes one of the oil and the water.

24. A method for managing slurry for a wire saw including a wire that has a plurality of wire lines extending in parallel to one another, wherein said wire is supplied with slurry containing abrasive grains in dispersing liquid to cut a workpiece so as to simultaneously produce a multiplicity of wafers, said method comprising steps of:

mixing the slurry in mixer means before said slurry is supplied to the wire saw;

discharging the slurry used to cut the workpiece from the wire saw, said discharged slurry including particle components smaller than the abrasive grains;

separating the particle components from the slurry to collect a mixture of the dispersing liquid and the grains from the slurry discharged from the wire saw;

transferring the collected mixture to the mixer means, wherein the mixer means mixes new slurry with the collected mixture; and adjusting the amount of the grains and the amount of the dispersing liquid, both supplied to the mixer means, to set the mixed weight ratio of the abrasive grains and the liquid including the oil within a range between 1:0.91 to 1:0.6 and mixed weight ratio of the abrasive grains and the liquid including the water within a range between 1:0.76 to 1:0.5 when the slurry is mixed in the mixer means.

25. A slurry managing system for a wire saw including a wire that has a plurality of wire lines extending parallel to one another, wherein said wire is supplied with slurry containing abrasive grains in dispersing liquid to cut a workpiece so as to simultaneously produce a multiplicity of wafers, said system comprising:

mixer means for mixing the slurry prior to supplying of the slurry to the wire saw;

first supplying means for supplying the grains to the mixer means;

second supplying means for supplying the dispersing liquid to the mixer means;

first adjusting means for adjusting the amount of the grains supplied to the mixer means from the first supplying means;

second adjusting means for adjusting the amount of the liquid supplied to the mixer means from the second supplying means;

said wire saw being arranged to discharge the slurry used to cut the workpiece, said discharged slurry including particle components smaller than the grains;

first separating means for separating a mixture of the particle components and the dispersing liquid from the slurry to collect the grains contained in the slurry discharged from the wire saw;

second separating means for separating the particle components from the mixture to collect the dispersing liquid contained in the mixture;

a first transferring passage for transferring the grains collected by the first separating means to the mixer means;

a second transferring passage for transferring the dispersing liquid collected by the second separating means to the mixer means, wherein the second transferring passage is connected to the first transferring passage to mix the dispersing liquid with the grains passing through the first transferring passage; and said mixer means being arranged to mix new slurry with the collected dispersing liquid and the collected grains.

* * * * *

UNITED STATES PATENT AND TRADEMARK OFFICE
CERTIFICATE OF CORRECTION

PATENT NO. : 5,799,643
DATED : September 1, 1998
INVENTOR(S) : Miyata et al.

It is certified that error appears in the above-indentified patent and that said Letters Patent is hereby corrected as shown below:

ON THE TITLE PAGE:
Item [54] Asignee please add:
--Nippei Toyama Corporation, Tokyo;
Toyobo Co., Ltd., Osaka, Both of Japan --

Signed and Sealed this

Twenty-seventh Day of March, 2001

Attest:

Attesting Officer

NICHOLAS P. GODICI

Acting Director of the United States Patent and Trademark Office